(12) United States Patent
Li et al.

(10) Patent No.: US 9,356,763 B2
(45) Date of Patent: *May 31, 2016

(54) TIMER MANAGEMENT IN WIRELESS COMMUNICATION

(71) Applicant: SUN MANAGEMENT, LLC, Cupertino, CA (US)

(72) Inventors: Yalun Li, Fremont, CA (US); William Li, Jr., Fremont, CA (US)

(73) Assignee: Sun Management, LLC

( * ) Notice: Subject to any disclaimer, the term of this patent is extended or adjusted under 35 U.S.C. 154(b) by 0 days.

This patent is subject to a terminal disclaimer.

(21) Appl. No.: 14/564,107

(22) Filed: Dec. 9, 2014

(65) Prior Publication Data

US 2015/0092725 A1    Apr. 2, 2015

Related U.S. Application Data

(63) Continuation of application No. 13/776,698, filed on Feb. 25, 2013, now Pat. No. 8,909,824, which is a continuation of application No. 12/198,860, filed on Aug. 26, 2008, now Pat. No. 8,386,667.

(51) Int. Cl.
*H04L 1/18* (2006.01)
*H04L 5/00* (2006.01)
*H04L 29/06* (2006.01)

(52) U.S. Cl.
CPC ............ *H04L 5/0078* (2013.01); *H04L 1/18* (2013.01); *H04L 1/1835* (2013.01); *H04L 1/1841* (2013.01); *H04L 1/1848* (2013.01); *H04L 69/28* (2013.01)

(58) Field of Classification Search
CPC ..... H04L 1/188; H04L 1/1809; H04L 1/1848; H04L 1/1864
USPC .......................................................... 710/29
See application file for complete search history.

(56) References Cited

U.S. PATENT DOCUMENTS

| | | | | |
|---|---|---|---|---|
| 5,754,754 A * | 5/1998 | Dudley | ............... | G06F 11/1443 714/18 |
| 5,872,777 A * | 2/1999 | Brailean | ............... | H04L 1/1621 370/349 |
| 7,013,346 B1 * | 3/2006 | Tucker | ................... | H04L 1/1614 370/229 |
| 7,352,702 B2 * | 4/2008 | Rosier | ................... | H04L 1/1614 370/236 |
| 7,406,106 B2 * | 7/2008 | Mallory | ............... | H04L 1/0003 370/522 |
| 7,676,721 B2 * | 3/2010 | Kim | ...................... | H04L 1/1848 714/747 |
| 7,746,861 B2 * | 6/2010 | Nishibayashi | ........ | H04L 1/1621 370/392 |
| 7,778,166 B2 * | 8/2010 | Dewan | .................... | H04L 47/10 370/229 |
| 7,839,834 B2 * | 11/2010 | Horn | ..................... | H04L 1/1803 370/343 |
| 7,843,943 B2 * | 11/2010 | Wu | .................... | H04L 12/40143 370/230 |
| 7,869,396 B2 * | 1/2011 | Chun | .................... | H04L 1/1635 370/328 |
| 7,924,805 B2 * | 4/2011 | Nishibayashi | ........ | H04L 1/1614 370/346 |
| 8,042,016 B2 * | 10/2011 | Park | ...................... | H04L 1/1621 370/282 |
| 8,085,781 B2 * | 12/2011 | Munson | .................. | H04L 47/10 370/394 |
| 8,102,880 B2 * | 1/2012 | Charpentier | .......... | H04L 1/1841 370/389 |
| 8,171,365 B2 * | 5/2012 | Nabetani | ............... | H04L 1/1854 714/748 |
| 8,630,245 B2 * | 1/2014 | Venkatachalam | ..... | H04W 48/10 370/329 |
| 8,873,535 B2 * | 10/2014 | Arulprakasam | ...... | H04L 1/1685 370/346 |
| 2008/0212505 A1 * | 9/2008 | Jung | ..................... | H04L 1/1848 370/310 |

* cited by examiner

*Primary Examiner* — Brian Misiura
(74) *Attorney, Agent, or Firm* — Joe Zheng

(57) ABSTRACT

This invention relates to techniques for managing a timer used in transmission or reception of data units in wireless communication. To better use the resources in a transceiver, one timer is used. Depending on how the data units being handled, the timer can be used to control a transceiver to retry transmission of data units or purge data units.

16 Claims, 18 Drawing Sheets

TIMER MANAGEMENT IN WIRELESS COMMUNICATION

FIELD OF INVENTION

This invention relates to techniques in the management of the transmission and reception of data fragments. Particularly, this invention relates to the use of a single timer in the management of transmitted or received data fragments.

BACKGROUND

In wireless transmission using a standard-based technology such as WiMAX, Automatic Repeat-reQuest (ARQ) is an error control method that utilizes acknowledgements and timeouts to achieve reliable data transmission and reception. Each connection is identified by a connection identification (CID) and allows the transmission of multiple service data units (SDUs). Each SDU may be fragmented or divided into one or more data blocks ("BLKs"), where each BLK is identified by a Block Sequence Number (BSN). During transmission, one or more data blocks are grouped into fragments ("FRs") that are first transmitted in sequence in the order of their BSN to the receiver to be reassembled. Each fragment can have one or more sequentially ordered data blocks that are identified by their BSN.

An index may be used to identify a particular CID, SDU, FR, or BLK herein. Thus, for example, a CIDi may represent the ith connection, an SDUi may represent the ith service data unit, an FRi may represent the ith fragment, and a BLKi may represent the ith data block.

An FR can be transmitted more than once if the transmitter does not receive an acknowledgement before the retry timer for the block times out. The first time a fragment is transmitted is referred to herein as the first transmission for the fragment.

FIG. 1 is a representation of an example of an organization of the data for transmission and the transmission sequence for the fragments as defined by IEEE 802.16 for WiMAX. The data to be transmitted has "i" connections represented by the CID list, CID1 through CIDi. The first connection with CID1 has "k" SDUs represented by an SDU list, SDU1 through SDUk. An SDU1 is fragmented into "m" fragments represented by FR1 through FRm while SDU2 is fragmented into "n" fragments represented by FR1 through FRn.

Each FR within an SDU is first transmitted sequentially. The FR in different SDUs is also first transmitted in the arriving order of the SDU. The dotted arrows in FIG. 1 illustrate the order that FRs are first transmitted. All FRs in SDU1 are first transmitted sequentially, and then the data blocks in SDU2 are first transmitted sequentially. This pattern continues for all the SDUs in a connection.

An acknowledgment is a message sent by the receiver to the transmitter to indicate that it has correctly received an FR or some FRs.

Typically, each FR to be transmitted has two timers, a life timer that starts when the FR is first transmitted and a retry timer that starts every time the FR is transmitted. The life timeout value for the life timer is greater than the retry timeout value for the retry timer. The retry timer controls the retransmission of an FR if the transmitter has not received the acknowledgement of that FR before the timeout of the retry timer. After an FR is transmitted, the transmitter waits for an acknowledgment of receipt of the FR from the receiver. If an acknowledgment is not received by the transmitter when the retry timer times out, the retry timer is restarted and the transmitter re-transmits the FR. This process is repeated until the life timer for the FR times out. When a life-timer of an FR times out, the transmitter sends a discard message to the receiver for that particular FR. On receiving the discard message, the receiver may discard the FR and all preceding FRs, i.e., FRs preceding in transmission sequence to the particular FR, and send an acknowledgement message for the FR and all the proceeding FRs. After receiving the acknowledgement, the transmitter may then delete that FR and the entire previous FRs. Since FRs in an SDU are first transmitted in time order, i.e., sequentially, and by the arriving order of the SDUs, and all FRs have the same total lifetime value, the life timer for the FRs will time out at the same order that they are first transmitted. See IEEE Std 802.16-2004, IEEE Standard for Local and Metropolitan Area Networks-Part 16: Interface for Fixed Broadband Wireless Access Systems, October 2004, and IEEE P802.16e-2005, Draft IEEE Standard for Local and metropolitan area networks Part 16: Air Interface for Fixed and Mobile Broadband Wireless Access Systems, Amendment for Physical and Medium Access Control Layers for Combined Fixed and Mobile Operation in Licensed Bands, and Corrigendum 1, February 2006.

The number of timers in a system is a provisioned number in an operating system. Each timer has a timer identification and a corresponding timer data structure. To open or close a timer, the operating system must undergo an inserting or deleting procedure from a timer link list that is operating system specific. Therefore, a system that requires the use of a large number of timers is expensive, both in terms of data memory and the operation of the timers.

Current methods for managing data blocks of fragments require the use of two timers for each data block or fragments. As defined by IEEE 802.16, the maximum number of fragments in the transmission window for a CID connection is 1024. Therefore, the maximum number of timers needed for transmission is 2*1024 for each CID connection. The number of timers required for even few CID connections is therefore very large. Using existing methods, the operating system has to be prepared to reserve a significant amount of its resource for the timers and their operations.

During reception, a fragment FRi, can be characterized by the following: the index "i", its arrival sequence number that is an indication of its sequence of arrival; the start BSNi or BSNi of FRi, the lowest BSN of the BLKs of Fri; and, ti, the time of its arrival. Therefore, FR1 is the first fragment to arrive while FR2 is the second fragment to arrive. For the two fragments FRi and FRj, if j>i, then tj>ti. Although fragments are transmitted sequentially in the order of their start BSN, they do not necessarily arrive in order due to loss and retransmission. Thus, BSNi may or may not be lower than BSNj.

A receiver window for each connection is managed with a receiver bitmap, where each bit of the bitmap represents a BSN block and the bitmap is ordered in the BSN sequence. Each bit is used to keep tracking whether its corresponding block has been received by the receiver or not. The window is defined by two pointers: one is a lower bound pointer and also referred to as the window-start BSN, and the other pointer is an upper bound pointer and also referred to as the window-highest BSN. The window-start BSN is the lower bound of the BSN of the receiver window and points to the lowest BSN of the BLK that has not been received yet. All blocks with BSN less than the window-start BSN are considered to have been correctly received. All currently received blocks have BSNs that are lower than the window-highest BSN, where the window-highest BSN block indicates an unreceived block with a BSN that is 1 higher than the highest BSN of the currently received blocks.

FIG. 2 is an illustration of a receiver window with four received fragments, FR1 through FR4 that have arrived in that sequence. The receiver window bitmap indicates whether a block in the receiver window has been received or not, where "0" indicates that the data block with that BSN has not been received, while "1" indicates that the block with that BSN has been received. Different fragments can contain a different number of data blocks. For example, FR1 contains 2 data blocks while FR3 only has 1 data block. In FIG. 2, the window-start-BSN is "x". BLKs may arrive at the receiver out of order relative to their BSN as the result of packet loss and retransmissions. In FIG. 2, FR1 that arrived first contains blocks with BSNs higher than the data blocks in FR2 which has a later arrival time.

At the beginning of the reception process, before the receipt of any data, the window-start-BSN and the window-highest BSN both are at the lowest BSN as there are no received blocks in the window. As fragments containing blocks are received, window-start BSN and window-highest BSN may increase and start moving forward. Using the example in FIG. 2, after FR1 has been received, the window-start BSN remains the same but the window-highest BSN is moved to x+7. These two pointers remain the same as FR2 is received. However, the receipt of FR3 moves the window-highest BSN pointer to x+8.

Current methods using the IEEE 802.16 standard uses purge timers to manage the moving forward of the receiver window if window-start BSN has not moved to a previously received block for some time period. As illustrated in FIG. 2, a purge timer, as indicated by "pi" where i is the index for the time, is started for each received fragment with a start BSN that is not equal to the window-start BSN. This purge timer for this received fragment is closed when the window-start-BSN is moved forward past the start BSN for this fragment. A timer assigned to and started for FRi, is identified as "pi". The timeout value for a purge timer is PL, the purge life for a fragment. Using the current methods, as indicated in FIG. 2, each fragment in the receiver window can be characterized by their arrival sequence number, start BSN, purge timer, and arrival time.

The window-start BSN is moved forward when one of two conditions is met. The first condition is the arrival of a received block in a received fragment with a BSN that matches the window-start BSN. The second condition is the timeout of a purge timer assigned to a received fragment in the receiver window. When the BSN of a received block in a received fragment matches that of the window-start BSN, the window-start BSN will move forward to the BSN of the first unreceived block. When a purge timer assigned to a received fragment times out, the window-start BSN will move forward to the first un-received block after that fragment. When the window-start-BSN moves forward, it will close the purge timers opened or started and assigned to any fragments along its path forward to the location of the new window-start-BSN.

There may be circumstances when one or more data blocks or data fragments are not received after a pre-determined number of re-transmissions. In order to avoid the situation where the receiver window is stuck at these data blocks, the receiver window will purge these unreceived blocks and continue with normal operation. That is, when a purge timer assigned to a fragment times out, the receiver will force the lower bound of the receiver window to move forward past the fragment with the timed out purge timer and to the first unreceived data block as if all fragments and data blocks, including the fragment with the timed out purge timer, have been received.

Current methodology uses a purge timer for each fragment in the receiver window. See IEEE Std 802.16-2004, IEEE Standard for Local and Metropolitan Area Networks-Part 16: Interface for Fixed Broadband Wireless Access Systems, October 2004; and IEEE P802.16e-2005, Draft IEEE Standard for Local and metropolitan area networks Part 16: Air Interface for Fixed and Mobile Broadband Wireless Access Systems, Amendment for Physical and Medium Access Control Layers for Combined Fixed and Mobile Operation in Licensed Bands, and Corrigendum 1, February 2006.

The maximum window size of a connection, identified by a connection identification ("CID") can reach 1024 as defined in IEEE Standard 802.16. Therefore, the maximum number of purge timers needed for the receiver is 1023 for each CID connection. This occurs when each fragment in the connection has only one data block. If a few CID connections are configured, the number of purge timer required can be very large.

The number of timers in a system is a provisioned number in the operating system. Each timer has a timer identification and a timer data structure. For run time operations to open or close a timer and for timeout procedures, the operating system has to go through an inserting and deleting procedure from a timer link list that is operating system specific. If there are a large number of purge timers, the operating system has to preserve a significant amount of its resources for the management of these purge timers, their identification, data structure, and their operations. Therefore, a receiver that uses a lot of timers is expensive, both for the data memory and the operation of the timers.

Due to the limitations of the prior art, it is therefore desirable to have novel approaches or methods for the management of transmission and/or receiving of fragments that would minimize the number of timers needed.

SUMMARY OF INVENTION

An object of this invention is to provide methods for the management of transmitted and/or received fragments that minimize the number of timers needed and lowers memory and operating requirements on the operating system.

Another object of this invention is to provide methods that scale well for different receiver window sizes and the number of CID connections.

This invention relates to methods for managing the transmission and reception of data fragments using a single timer. According to one embodiment of the this invention, the methods include the following steps: processing said fragments sequentially, wherein each fragment having a processing index that corresponds to the sequential processing of that fragment; processing each of said fragments until a termination upon the meeting of a first pre-defined condition; assigning a timer to an un-terminated fragment having the lowest processing index; starting said timer having a timeout value; and running said timer until the processing of said un-terminated fragment is terminated.

An advantage of the methods of this invention is that only one timer is needed for the management of received fragments and data blocks for each CID connection and only one timer is needed for the management of transmitted fragments.

Another advantage of the methods of this invention is that systems using these methods scale well for different receiver window sizes and number of CID connections.

DESCRIPTION OF DRAWINGS

The foregoing and other objects, aspects and advantages of the invention will be better understood from the following detailed description of preferred embodiments of this invention when taken in conjunction with the accompanying drawings in which.

DETAILED DESCRIPTION OF THE PREFERRED EMBODIMENTS

Terminology

Figure 1:
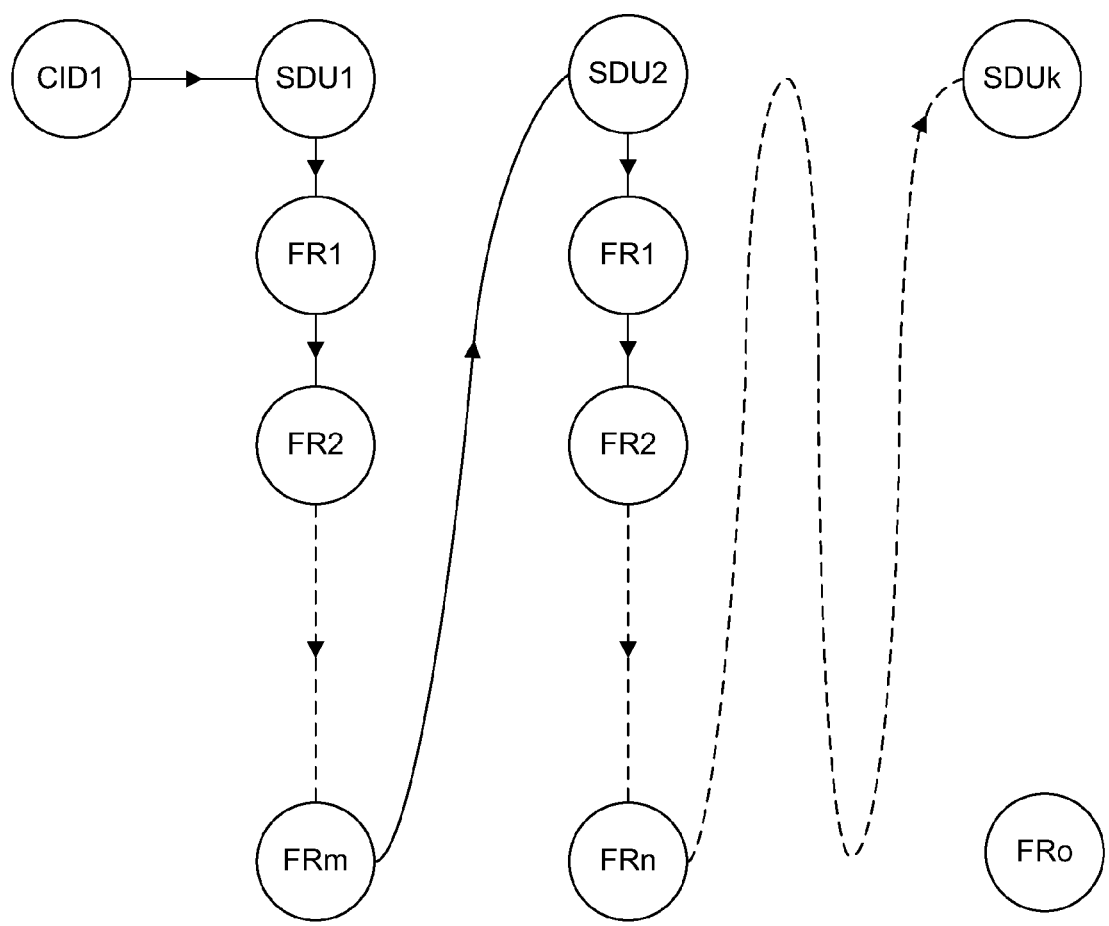
FIG. 1 is a representation of the connections, SDUs, and data blocks in a prior art data transmission method and the sequence for the first transmission of the data fragments.
Figure 2:
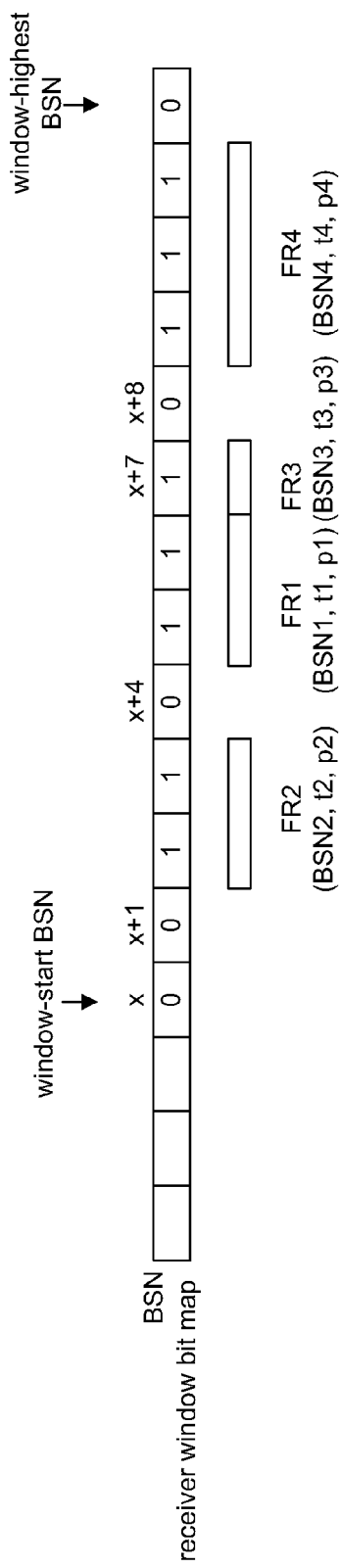
FIG. 2 is an illustration of a receiver window for received fragments in a prior art method for managing received fragments.

The following terminology may be used to describe the preferred methods of this invention. However, they should not be interpreted in a manner limiting the scopes of the methods and embodiments of the present invention.

FR. A fragment or data fragment that may contain one or more BLK. If a particular fragment has a processing index "i", then the fragment may be referred to as FRi.

BLK. A block or data block. Each BLK is characterized by a block sequence number ("BSN").

Start BSN. The lowest BSN for the BLKS in an FR. Start BSNi is the start-BSN for FRi.

Transceiving. Either transmitting or receiving.

Processing Index ("i"). An index for referencing the sequential order of transmission or reception for an FRi.

Transmission Index ("i"). An index referencing the sequential order of transmission for Fri.

Reception Index ("i"). An index referencing the sequential order of reception.

Processing Time ("ti"). ti may be referred to as the initial processing time for a fragment Fri. For transmission, this may be the transmission time for an FRi. For reception, this may be the reception or arrival time for the FRi.

Retry Timer. A timer that may be used during transmission.

Purge Timer. A timer that may be used during reception.

Retry Life ("RL"). RL may be referred to as the length of time between the transmission of an FR and its re-transmission.

Purge Life ("PL"). A length of time between the reception or arrival of an FR and its purging.

Fragment Life ("FL"). A length of time for an FR before it is retransmitted or purged. Fragment life is not the same as the total lifetime value for a fragment as the total lifetime value means the sum of all the fragment lives for all transmission and re-transmissions of the fragment.

Assignment Time ("t"). An assignment and starting of the timer.

Current Time. A time that a particular action under discussion is occurring or have just occurred. For example, if an FR is retransmitted or has just been retransmitted, then the current time is the processing time for that FR. In another example, if a timer is being assigned or have just been assigned to a fragment, then the current time is the assignment time.

Unterminated FR. An un-terminated FR may be an FR whose processing has not terminated.

Acknowledged FR. A FR that has received an acknowledgement for any BLK in that FR. A FR is acknowledged if it has received an acknowledgement of receipt for any BLK in that FR.

Deleted Fragment. A FR that is deleted.

Negative-Acknowledged FR. A FR that has received a negative-acknowledgement. A FR is negative-acknowledged if it has received a negative-acknowledgement of receipt for any BLK in that fragment.

Unacknowledged FR. A FR that has not received a negative-acknowledgement or an acknowledgement.

Effective Entry. The entry in a R_T table or a P_T that has an unterminated FR.

TMC. A TMC is a timer management chain.

Individual Fragment Controller. An individual Fragment Controller contains the information associated with a particular individual FR. If the FR is represented as FRi where i is the processing index for that FR, then the individual Fragment Controller may be represented as FCi.

Header Node. The first node in a timer management chain.

Preferred Methods for the Transmission or Reception of Fragments

The presently preferred methods of the present invention use a single timer for the management of the transmission or reception of data fragments, where each of the data fragments contains one or more data blocks. The methods may include the following steps:

initiating the processing of the FRs. For transmission, this step may involve the transmission of FRs while for reception, this step may involve the receiving or arriving of FRs;

noting the sequential order for the initiating of the processing of said FRs. The sequential order for the transmission or reception of FRs is provided. The sequential order for initiating the processing may be indicated by a processing index. This processing index may be referred as a transmission index during transmission and may be referred to as a reception index during reception;

processing each of the FRs until the processing is terminated;

during the processing of the FRs, assigning the one timer that is being used either for transmission or reception to the un-terminated FR that has the lowest processing index at the assignment time;

starting said timer;

running said timer assigned to the fragment having the lowest processing index order until the processing for that FR is terminated; and repeating the assigning, starting, and running steps by assigning the timer to the next un-terminated FR having the lowest processing index, starting and running the timer until the processing of the next un-terminated FR is terminated.

The processing of an FR terminates upon the meeting or satisfaction of one or more predefined conditions (first pre-defined condition). This processing of an FRi may include the noting or storing identifying information that characterizes FRi. For transmission, this information may include i, the transmission index for FRi; BSNi, its start-BSN; the length of FRi, i.e., the number of BLKs it has; and, ti, the time of transmission for FRi. For reception, this information may include i, the reception index for receiving the FRi, BSNi, its start-BSN, the length of FRi, i.e., the number of BLKs it has; and ti, the arrival or reception time. The processing may also include the checking to see if any the processing time for any FR being processed is equal to or exceed the FR life.

The timeout value is a function of the fragment life, the assignment time, and the processing time. For preferred embodiments, the timeout value is $FL-(t-ti)$, where FL is the fragment life, t is the assignment time and ti is the processing time. For transmission, the timeout value for the timer is a function of the retry life, the assignment time, and the transmission time. In the preferred methods, the timeout value during transmission is $RL-(t-ti)$ where ti is the transmission time. During the re-transmission of a fragment, if a timer is assigned to an FR that is being re-transmitted, the timeout value for that fragment FRi may be $RL-(t-ti)$, where ti is the time that FRi is being re-transmitted. For reception, the timeout value for the timer is a function of the purge life, the assignment time, and the reception time. For the preferred methods, it may be $PL-(t-ti)$. If a timer is assigned to a duplicate block that has been received during reception, the timeout value for the timer may be $PL-(t-ti)$, where ti is the reception time for that duplicate fragment, not the reception time for the original fragment.

During transmission, if the retry timer times out, the retry timer may be restarted again until the total number of retries exceeds a pre-determined value. For the preferred embodiments of this invention, after a retry timer times out, the FR assigned to the timer is re-transmitted. For the preferred embodiments of this invention, when an FR is re-transmitted, the processing of this fragment may be considered to again be initiated such that i, its transmission index may be the index referencing the sequential order for the re-transmission and not the transmission index referencing the sequential order for the original transmission or any other previous re-transmission.

Similarly for reception, if a duplicate fragment is received, processing of this duplicate fragment may be considered to be initiated at the time of receipt of the duplicate FR such that its reception index is the index referencing the sequential order for the reception of that duplicated fragment, and not the reception index for the reception of that original FR or the reception of any previously received duplicate FR.

The processing of an FR may be terminated upon the meeting of one or more pre-defined conditions (first pre-defined conditions). If a timer is assigned to an FR, one of the pre-defined conditions for the termination of the processing for that FR may be the time out of the timer assigned to that FR. For transmission, the other pre-determined conditions for the termination of the processing for an FR include: the reception of an acknowledgement of receipt for any BLK in that fragment; the deletion of any BLK in the fragment; and the receipt of a non-acknowledgement for a BLK in the fragment.

For reception, the other pre-determined conditions for the termination of the processing for an FR include: the arrival of a duplicate fragment for that fragment; the moving of the window-start BSN for the receiver window such that the start-BSN for that FR is not within the receiver window, i.e., the start-BSN for that FR is less than or equal to ($\leq$) to the new window-start BSN.

The window-start BSN may be moved forward when one of two pre-defined conditions (second pre-defined conditions) is met. The first is the arrival of a received BLK in a received FR with a BSN that matches the window-start BSN. The second condition is the timeout of a purge timer assigned to a received FR in the receiver window. When the BSN of a received BLK in a received FR matches that of the window-start BSN, the window-start BSN will move forward to the BSN of the first unreceived BLK in the receiver window. When a purge timer assigned to a received FR times out, the window-start BSN will move forward to the first un-received BLK with a BSN greater than the BSN of that received FR that has timed out. Depending on the value of the new window-start BSN, this may or may not terminate the processing of an FR. If the start-BSN of a processing FR is still greater than the new window-start BSN, i.e., if the FR is still within the receiver window, then the FR is not terminated. However, if the start-BSN of an FR is less than the new-window-start BSN, i.e., if the FR is no-longer within the receiver window, then the FR is terminated.

Figure 3:
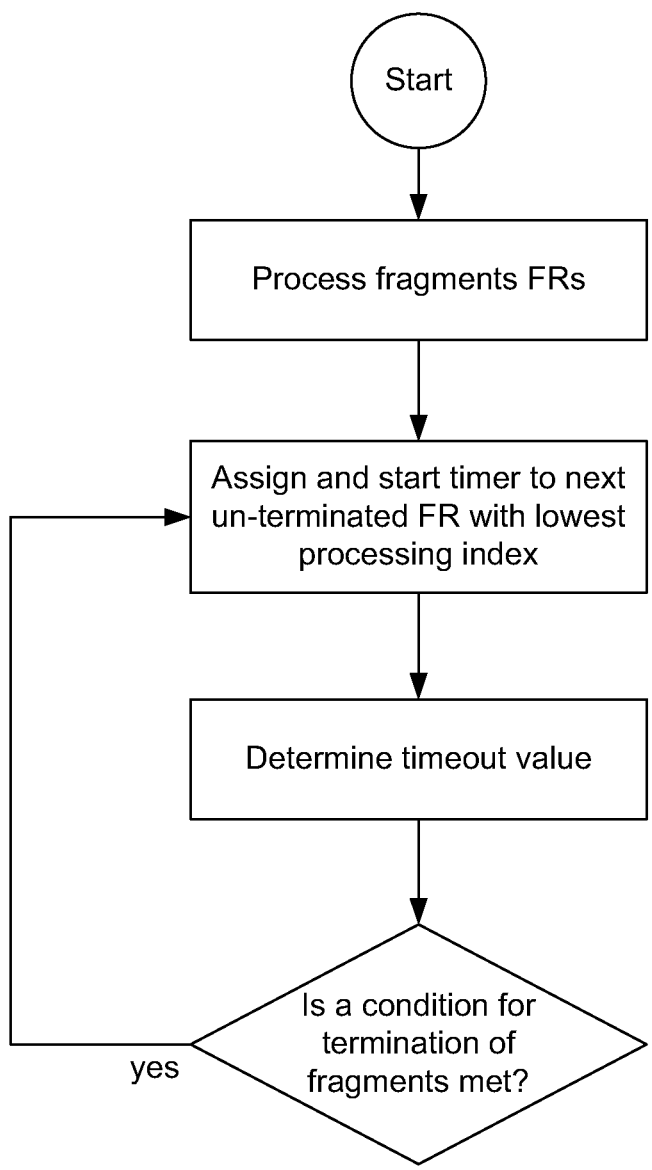
FIG. 3 is a representation of the method for managing fragments during transmission or reception using the preferred methods of this invention.

FIG. 3 is an illustration of the preferred methods described above. While processing the FRs, the next un-terminated fragment having the lowest processing index is identified and the retry timer is assigned to this un-terminated fragment and the timer is started. This timer remains with the fragment until the conditions for the termination of this FR is met. The timer is re-assigned and restarted as before. If no condition for the termination of the FR is met, then the processing continues.

In certain preferred methods of this invention, the information for the management timer and the identifying information for the fragments being processed may be stored in the entries or storage locations of a timer table (T table) and/or a data structure such as a Fragment Controller.

An entry of the timer table may be used to record one or more identifying information of a fragment that may include: its identifying address, its start address, its address in a data structure such as a Fragment Controller. The data structure may contain other identifying information for the fragment such as the start BSN for that FR, its processing index of a function of its processing index, and an FR pointer that links or points from the data structure containing the fragment's identifying information to and from the entry for that fragment.

Figure 4A:
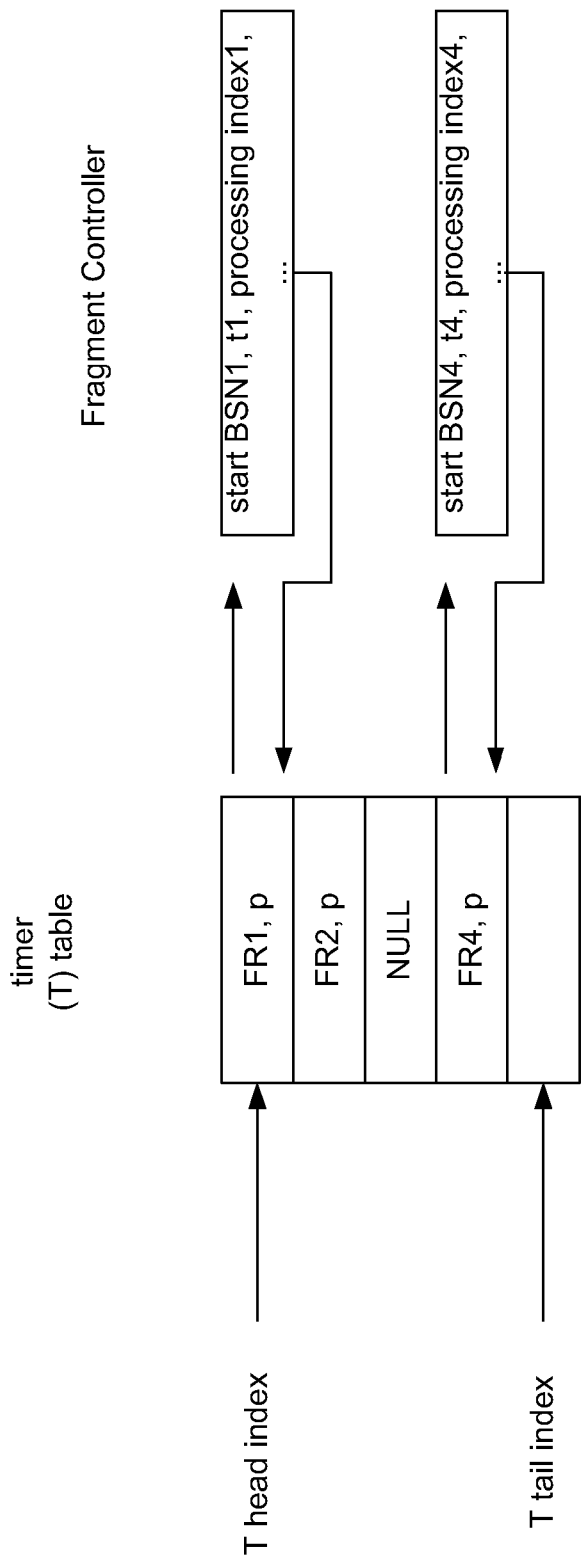
FIG. 4a is an example of a timer table for a preferred method of this invention.

Some of the identifying information for each FR is entered into the T table in accordance with and in sequence of their processing index. The T table may contain pointers with each pointer pointing to and from the FR in the table to the set of information for that FR contained in the Fragment Controller. The management information for each fragment FRi with its processing index "i" is contained in the Fragment Controller. The Fragment Controller may also contain the start-BSNi and the processing time for the FR. FIG. 4a is an example of a timer table with pointers that links each entry for a fragment in the table with its corresponding information in the fragment controller as indicated by the arrows pointing back and forth from the fragment controller to the timer table (T Table). In this example, the fragment controller contains the start BSN and the processing index for each fragment.

The T table may be bounded by two indices, the T head index that points to the first un-terminated Fragment and the T tail index that points to the first unoccupied entry in the T table. For example, see FIG. 4a.

Since the entries in the T table are arranged according to their processing index or as a function of their processing index and the fragment life of the FRs is the same, the FRs in the T table will time out in the same order as their processing index. The one timer may then be first assigned to the first entry in the T table and started. If this timer times out, the FR at this first entry may be re-processed again. For this re-processing, this start address and the pointer information for this FR will be logged, according to its new processing index order based upon the time of re-processing, as the last entry in the entry in the T table where the T tail index pointed. The T tail index is increased by one, to the next unoccupied entry in the T table. The T head index is then moved to the next effective entry, i.e., the next entry with an un-terminated FR. The timer is assigned to the FR in the entry for the new T head index, FRi, and restarted. The new timeout value may be (RL−(t−ti)) where t is the assignment time and ti is the time of re-processing. The information relating to the assignment time and the T tail index may be stored in the Fragment Controller.

If the processing of an FR that the timer is not assigned to is terminated because one of the pre-determined condition is met, the entry for that timer may be removed from the T table by putting a NULL in that Fragment's current entry position.

A fragment is re-processed when the timer times out during transmission and the FR is re-transmitted, or when a duplicate of an FR that has been previously received is received again. Any fragment that is re-processed (also sometimes referred to as processed) has a processing index and initial processing time, that reflects the re-transmission time or the time for the arrival of a duplicate FR. For preferred embodiments where a T table and a Fragment Controller is used to manage the fragment information, the re-processing time and the T tail index information are saved in the Fragment Controller, the address of this re-processed FR is saved in the entry of the T tail, and the T tail index is increased by one.

The T table and Fragment Controller are just one of many methods to implement the preferred methods of this invention. Any algorithm that can identify the earliest un-terminated fragment and control the assignment of the timer according to the methods of this invention can be used.

Figure 13:
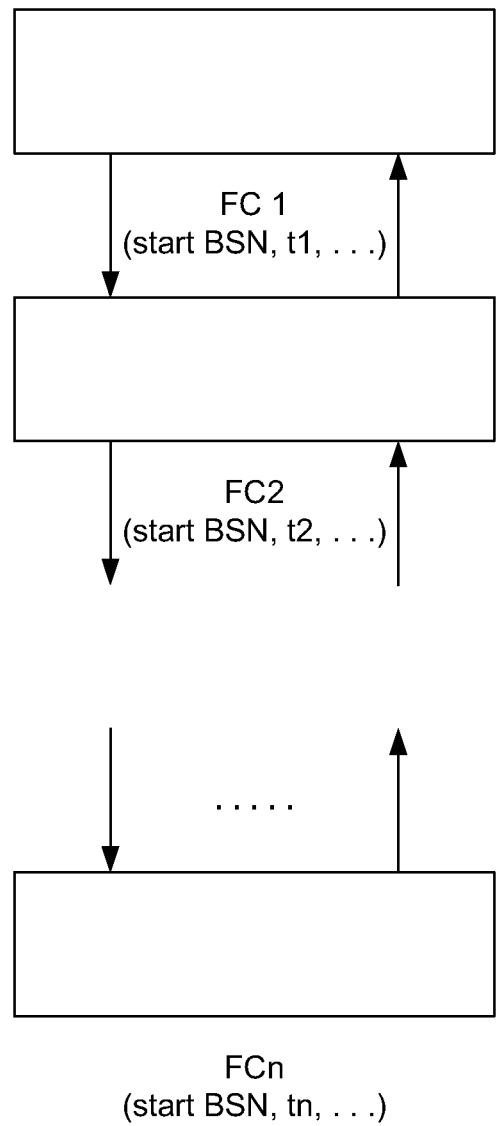
FIG. 13 is an example of a timer management chain for a preferred method of this invention.

For example, in other preferred embodiments, a timer management chain ("TMC") where the nodes in the chain are linked, preferably bi-directionally, may be used for the management of the timer. Each node in the chain is associated with a particular fragment and the nodes may be organized in the order of the processing index of their FR, i.e., the FR associated with the node. Each node contains the relevant information for the fragment, hereby referred to as the Individual Fragment Controller for that node and its FR. An Individual Fragment Controller may be represented by FCi, where i is the processing index for that particular FR and may contain information such as the start BSN or the processing time. In the preferred embodiments where the nodes in the chain are organized in the order of the processing index, the first node contains FC1, the Individual Fragment Controller for FR1; the second node contains FC2, the Individual Fragment Controller for FR2; and the last node in the chain contains the Individual Fragment Controller for the FR with the highest processing index. FIG. 13 is an example of a bi-directional TMC.

As seen in FIG. 13, when these chains are bi-directional, each Individual Fragment Controller has two pointers, one pointing to the previous node, and the other pointing the next node. This enables the easy removal of a node in the middle of the chain.

When a new FRj with a processing index of j is initially processed, its processing time may be recorded in its Individual Fragment Controller, FCj, and a new node containing the FCj may be added to the end of TMC. If this node is the first in the chain, i.e., j=1, the timer is assigned to FR1.

Upon meeting of a first pre-defined condition that terminates the processing of an FR in the chain, the node for that FR is removed from the chain. If the FR is re-processed, e.g., if the fragment associated with the node is re-transmitted or a duplicate node is received, the information in the Individual Fragment Controller for this fragment may be updated to reflect the new processing time and the new processing index, and/or added or attached to the end of the chain. If the node for this FR whose processing is terminated is the header node, i.e., the first node, after removal, the next node, the node with the next lowest processing index then becomes the header node. If the timer was assigned to the original header node, then, the timer is closed, and reassigned to the fragment for the new header node with a timeout value of FL−(t−ti) where t is the new assignment time and ti is the processing time for this fragment for the new header node.

Preferred Methods for Transmission of Fragments

The presently preferred methods of this invention utilizes only one retry timer for the management of the transmission of FRs for each CID connection instead of the large number of retry timers needed if prior art methods of block and fragment management are used. The preferred methods initially transmit the FRs in the sequential order of their start-BSN starting with the first FR of the first SDU. For each FR, the sequential order of transmission "i", the start-BSN for that fragment, and the initial processing time, i.e., the transmission time, may be noted or stored. Therefore, initially, the processing index is a reflection of the sequential order of the start-BSN of the Fragments. However, this may change during processing as some FRs may be re-transmitted while others may be acknowledged and thus have no need for re-transmission. Therefore, in general the processing index may or may not be a function of the start-BSN of an FR.

While processing during transmission, the one timer, the retry timer, is assigned to and started for the un-terminated FR having the lowest processing index. The retry life of a fragment expires and times out when the retry timer assigned to this fragment, i.e., the retry timer for this fragment, times out. At the same time while continuing to transmit the FRs sequentially, the transmitter waits for the satisfaction of one or more of the following conditions for the transmission of that fragment to be terminated or concludes:

timing out of the retry timer if the retry timer is assigned to that fragment;
the acknowledgement of that fragment;
the negative acknowledgement of that FR; or
the deletion of that FR.

After meeting one of the above conditions for the termination of the processing of an FR that a retry timer is assigned to, the transmitter may remove the acknowledged FR from its list of FRs for this SDU, also referred to herein as an FR list.

In the preferred methods, when the processing of the FR that the retry timer is assigned to has terminated, the retry timer is removed and reassigned to the next un-terminated FR having the lowest processing index and restarted accordingly. The next un-terminated FR may or may not be the next FR of the SDU as the next FR may be terminated because one of the pre-determined conditions for terminating the processing for that next FR may have been met. For example, the second fragment may have been an acknowledged FR.

The timeout value for the retry timer for this next un-terminated FRi with a processing index "i" is a function of t, the assignment time or the time of assignment of the retry timer to the FR and the re-starting of the timer, RL, the retry life, and ti, the initial processing time or the transmission time. Preferably, the timeout value is RL−(t−ti). For example, if the next un-terminated block is FR3 of SDU1 and t3 is the initial transmission time for this FR3, the timeout value for the retry timer for FR3 may be RL−(t−t3) since (t−t3) time has passed before since FR3 has been initially processed or transmitted. This process can be repeated for each un-terminated FR in each SDU for each CID connection. The transmission time of each FR and the sequential order of its initial processing or transmission may be saved, possibly in the data block's management data structure.

Figure 4B:
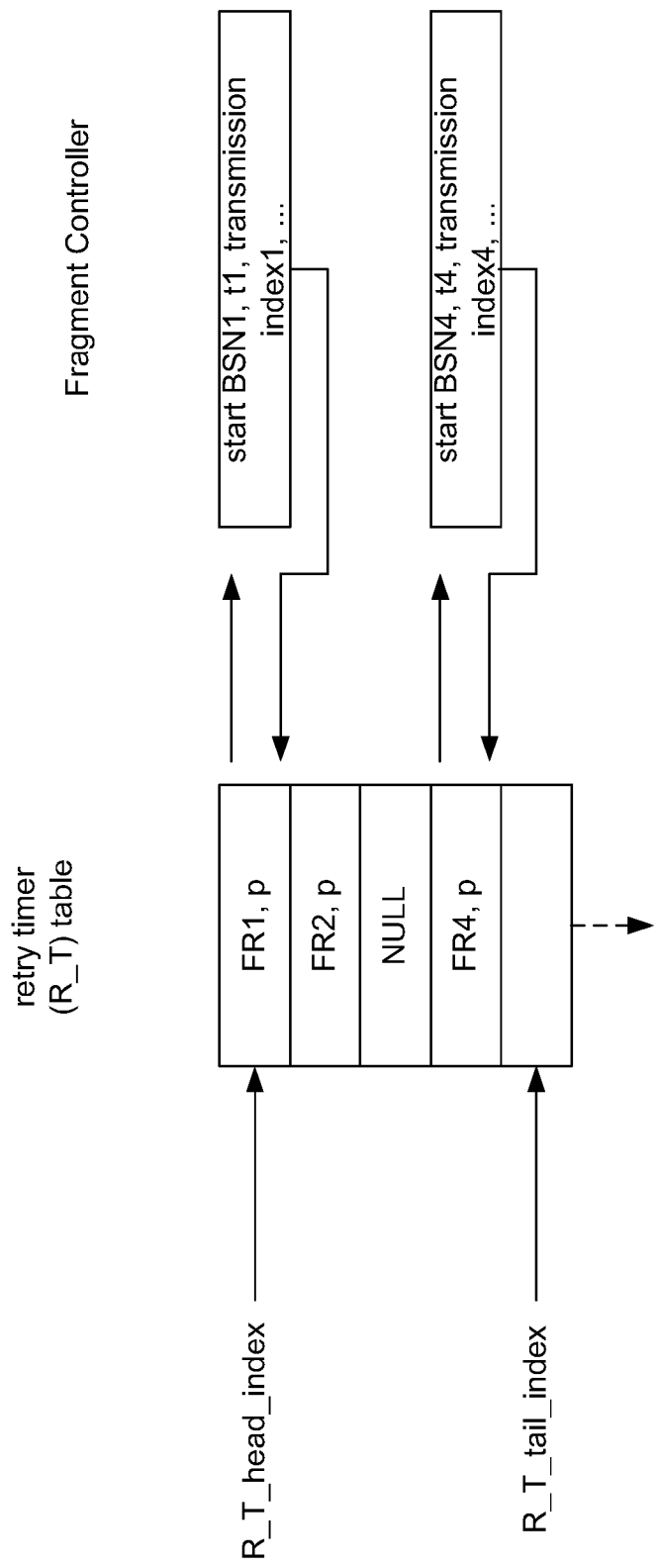
FIG. 4b is an example of a retry timer table for a preferred method of this invention.

In certain preferred methods of this invention, the information for the management of a retry timer table (R_T) table may be used to record an FR's start address, FR pointer, and the processing index or a function of the processing index. The retry time related information may be stored in a retry timer table (R_T table) and the Fragment Controller. FIG. 4b is an illustration of a R-T Table and a Fragment Controller. In FIG. 4b, the start address and pointer (p) for each FR that is transmitted is entered into the R_T table in accordance with their processing index. The R_T table contains pointers (indicated by arrows) with each pointer pointing from the FR in the table to the set of information for that FR contained in the Fragment Controller. The management information for each fragment FRi with its processing index or transmission index, also sometimes referred to as its R_T index "i" is contained in the Fragment Controller. The Fragment Controller may also contain the start BSNi and ti. The R_T table is bound by two indices, the R_T head index that points to the first un-terminated fragment and the R-T tail index that points to the first unoccupied entry in the R_T table.

Since the entries in the R_T table are arranged according to their processing index or as a function of their processing index and the retry life of the FRs is the same, the FRs in the R_T table will time out in the same order as their processing or R_T index. The one retry timer will be first assigned to the first entry in the R_T table and started. If this timer times out, the FR at this first entry may be re-transmitted again. For this re-transmission, this start address and the pointer information for this FR will be logged, according to its new processing index order based upon the time of re-transmission, as the last entry in the entry in the R_T table where the R_T tail index pointed. The R_T tail index is increased by one, to the next unoccupied entry in the R_T table. The R_T head index is then moved to the next effective entry, i.e., the next entry with an un-terminated FR. The retry timer is assigned to the FR in the entry for the new R_T head index, FRi, and restarted. The new timeout value may be (RL−(t−ti) where t is the assignment time and ti is the time of re-transmission. The information relating to the assignment time and the R_T tail index may be stored in the Fragment Controller.

If the processing of an FR that the timer is not assigned to is terminated because one of the pre-determined condition is met, the entry for that timer may be removed from the R_T by putting a NULL pointer in that fragment's current entry position since that fragment's Fragment Controller has that fragment's entry in the R_T table.

Any fragment that is re-transmitted has a processing index that reflects the re-transmission time. For the preferred embodiments, where a R_T table and a Fragment Controller are used to manage the fragment information, the re-transmission time, R_T tail index information is saved in the Fragment Controller, the address of this FR's Fragment Controller is saved in the entry of the R_T tail, and the R_T tail index is increased by one.

If a timer is to be closed and reassigned to the next un-terminated FRi having the lowest processing index ("i") and restarted, this new timer triggers a timeout value for the timer of RL−(t−ti) where t is the assignment time and ti is the initial processing time for FRi.

For the preferred embodiments where a R_T table and a Fragment Controller are used to manage the fragment information, when the timer attached to an FR times out and that fragment is re-transmitted, the initial processing time for the timed out fragment, i.e., the re-transmission time determines the processing time and thus the new processing index for this re-transmitted FR, the address of this re-transmitted FR may be be logged at the next unoccupied entry at the next R_T tail index, the re-transmission and other relevant information may be saved in the Fragment Controller, and the R_T tail index is adjusted accordingly.

The next effective entry in the R_T table, if it exists, may be checked to see if it has timed out. To check if a next entry exists or not, the R_T head index is increased by 1 and checked against the R_T tail index, if R_T head index=R_T tail index, then no entry exists. To check if an entry is effective, the entry is checked to see if any of the conditions for termination exists, if it does not, then the entry is effective.

If the current time, the time for checking whether an FR has timed out, is ≥RL+ti, i.e., if the time of checking for FRi is greater than RL+ti, then FRi has timed out. If it has timed out, then the above described procedure for locating the next effective entry may be repeated. If it has not timed out, then the re-try timer is assigned to this un-terminated fragment and restarted. The flowchart for this process is illustrated in FIGS. 5 and 6.

Figure 5:
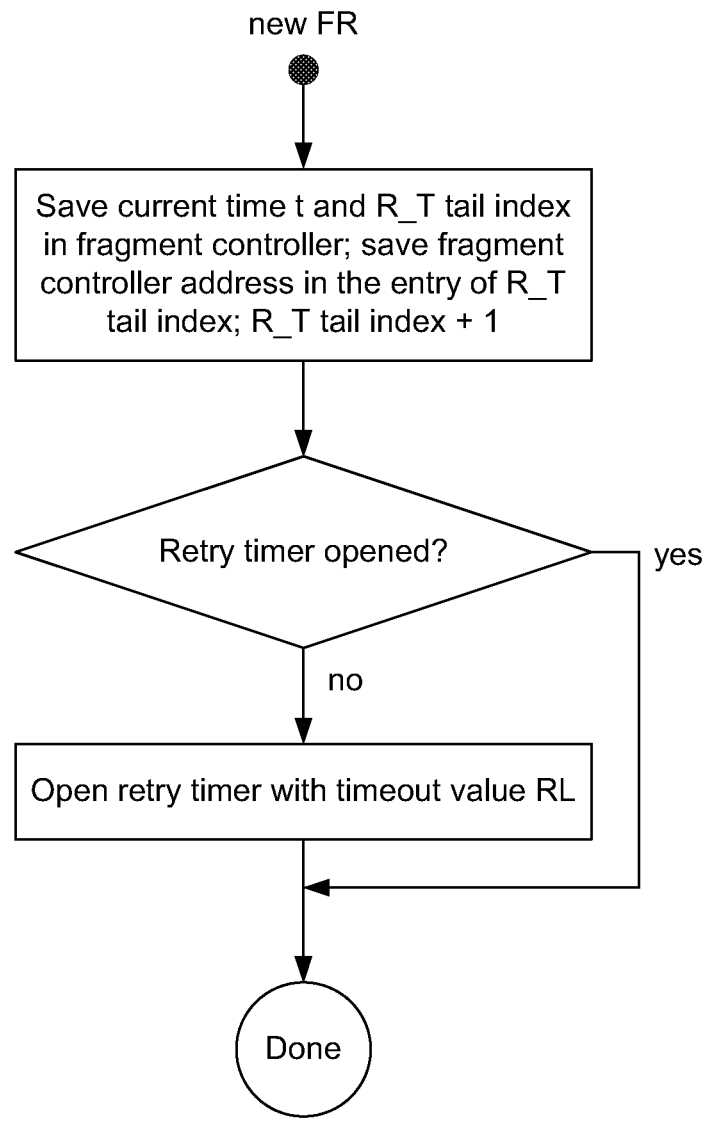
FIG. 5 is a flowchart illustration a preferred method of this invention for the transmission of a new fragment.
Figure 6A:
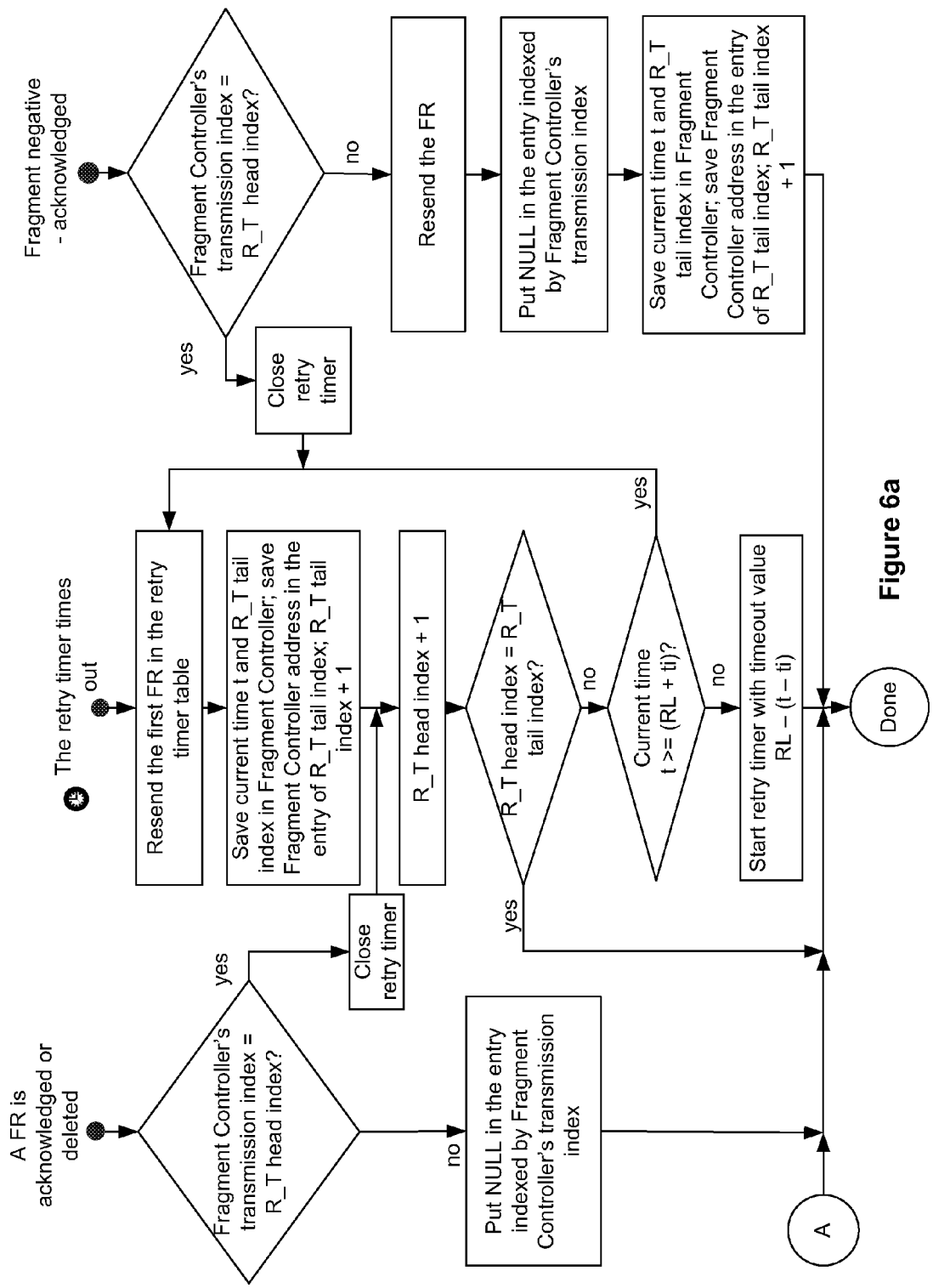
FIGS. 6a and 6b are flowcharts illustrating a preferred method of this invention for managing the transmitted fragments.
Figure 6B:
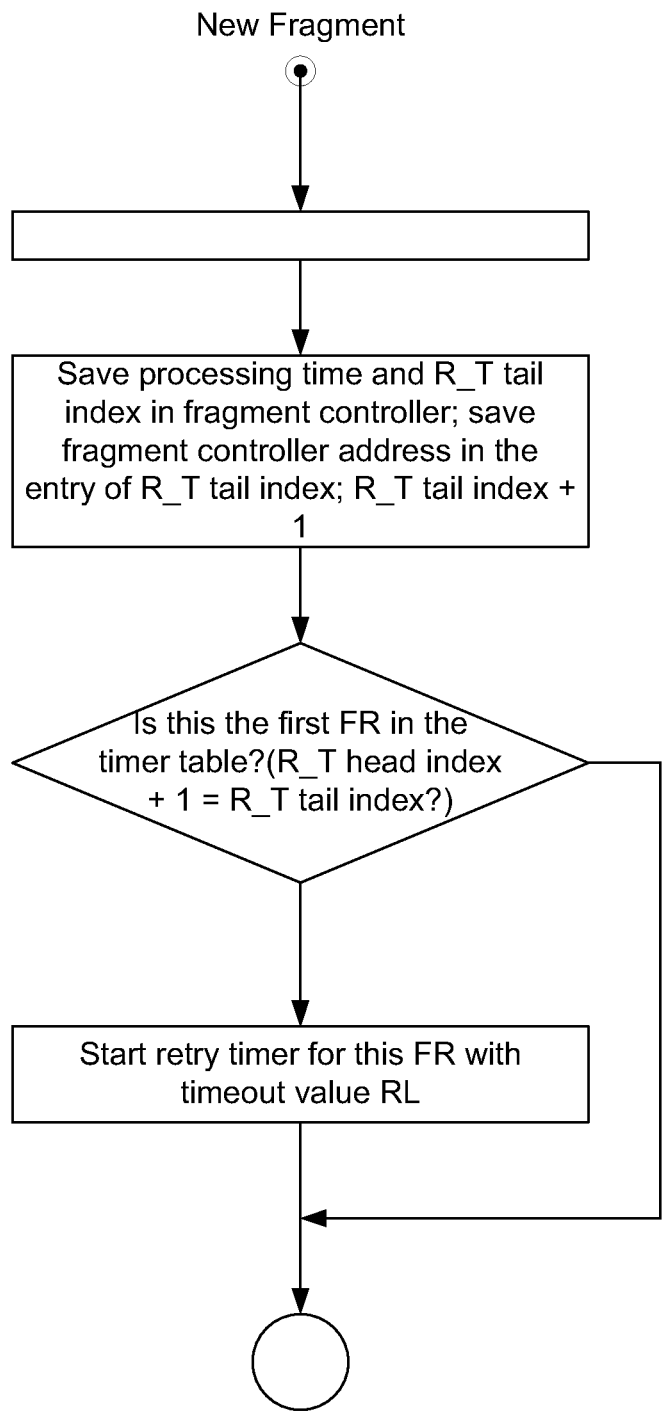

As illustrated in FIGS. 5 and 6a and 6b, during transmission, the following events may trigger the re-assignment or restarting of the retry timer:

A new FR is transmitted. The management information for this FR and its processing index is noted or saved. If a retry timer has already been started, then no other step may be needed. If no retry timer has been opened, the retry timer may be assigned to this FR and started with a timeout value of RL, the retry life. In the preferred embodiments where a R_T table and a Fragment Controller is used to managed the fragment information, the transmission time, R_T tail index information is saved in the Fragment Controller, the address of this new FR is saved in the entry of the R_T tail, and the R_T tail index is increased by one. If no retry timer has been opened, i.e., if this fragment is entered as the first entry of the R_T table, then the retry timer is assigned to this fragment and started where the assignment time is equal to the transmission time. FIG. 5 illustrates this process.

The retry timer times out. The fragment that the retry timer is assigned to is re-transmitted that may follow the algorithm described above. The timer is reassigned to the next un-terminated FR having the lowest processing index, FRi and restarted that may follow the algorithm described previously. For preferred methods that implement this algorithm using a R_T table, the next effective entry may be found as described above and the retry timer is assigned to the FR at this effective entry, FRi. The timeout value for this retry timer is set as RL−(t−ti) where RL is the retry life, t is the assignment time and ti is the transmission time for this FRi.

A FR is acknowledged or deleted. If the retry timer is assigned to the fragment, then the retry timer is closed and reassigned to the next un-terminated fragment having the lowest processing index if such a fragment exists. The algorithm for locating this next unterminated fragment may follow the process for the re-assignment of the timer as described above. In addition, any un-terminated FR with the current time less than the sum of RL and ti may be retransmitted, and its new processing index and initial processing time noted accordingly. If the retry timer is not assigned to the acknowledged or deleted fragment, the FR may be noted as terminated. For the preferred embodiments where a R_T table and a Fragment Controller is used to manage the fragment information, if the FR that is acknowledged or deleted is the first entry in the R_T table, that is, if that FR has a timer assigned, then the timer is closed and started for the next effective FR entry in the R_T table, if that FR exist. In addition, any FR with the current time smaller than the sum of RL and ti may also be re-transmitted as described above. If the FR is acknowledged or deleted is not the first entry in the R_T table, NULL may be inserted in the entry indexed by the Fragment Controller's R_T index to indicate that the processing of that FR has terminated. The flowchart for this process is illustrated in FIGS. 6a and 6b If a fragment is negative-acknowledged and if the retry timer is assigned to that fragment, then the FR may be processed as if it had timed out following the process described above for the processing of an FR with the assigned timer that has timed out. If a timer is not assigned to that negative-acknowledged FR, then it may be re-transmitted following the same process for re-transmission as described above.

Figure 14A:
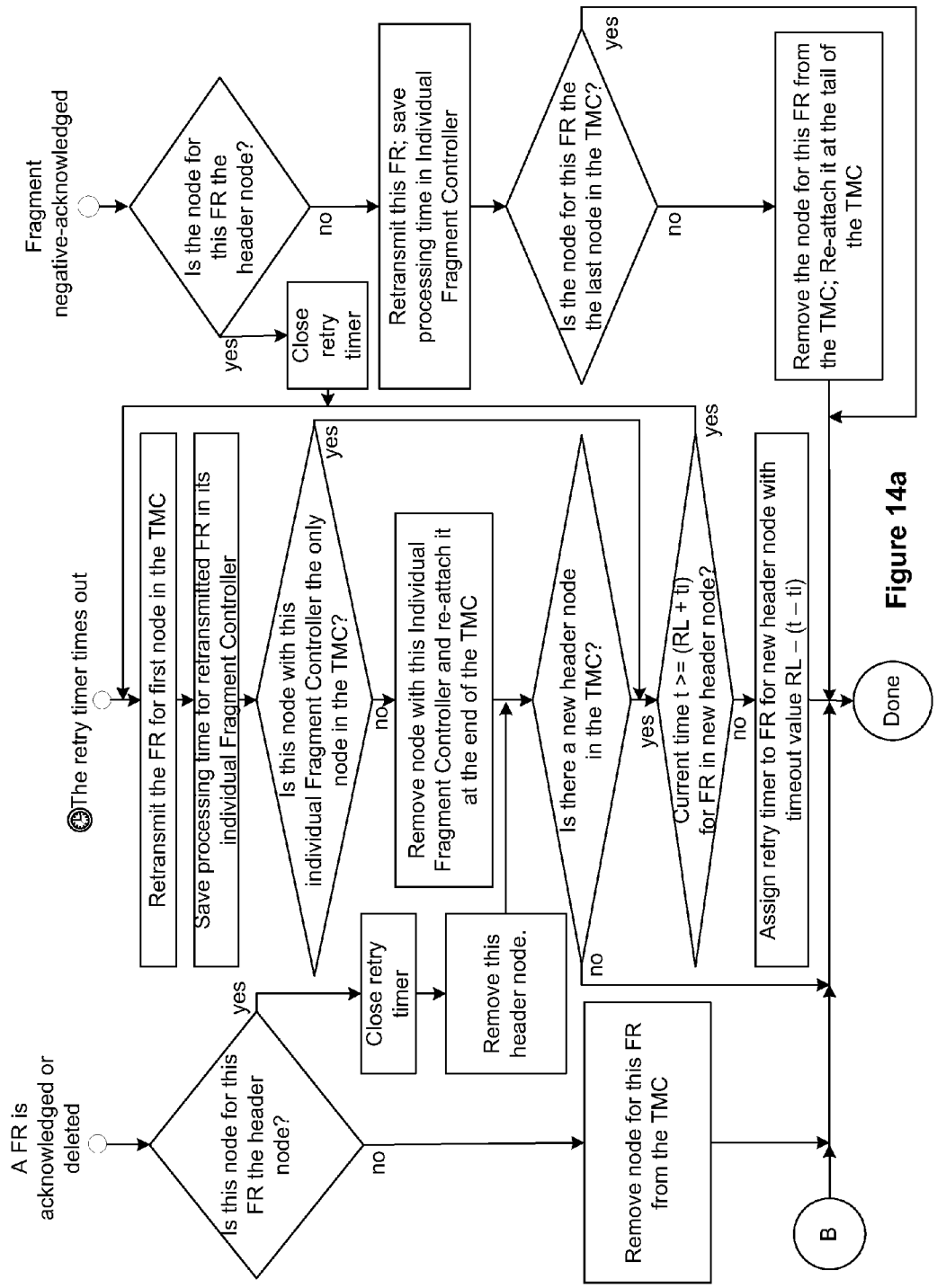
FIGS. 14a and 14b are flowchart illustrating a preferred method of this invention using one timer and a timer management chain for transmitting fragments.
Figure 14B:
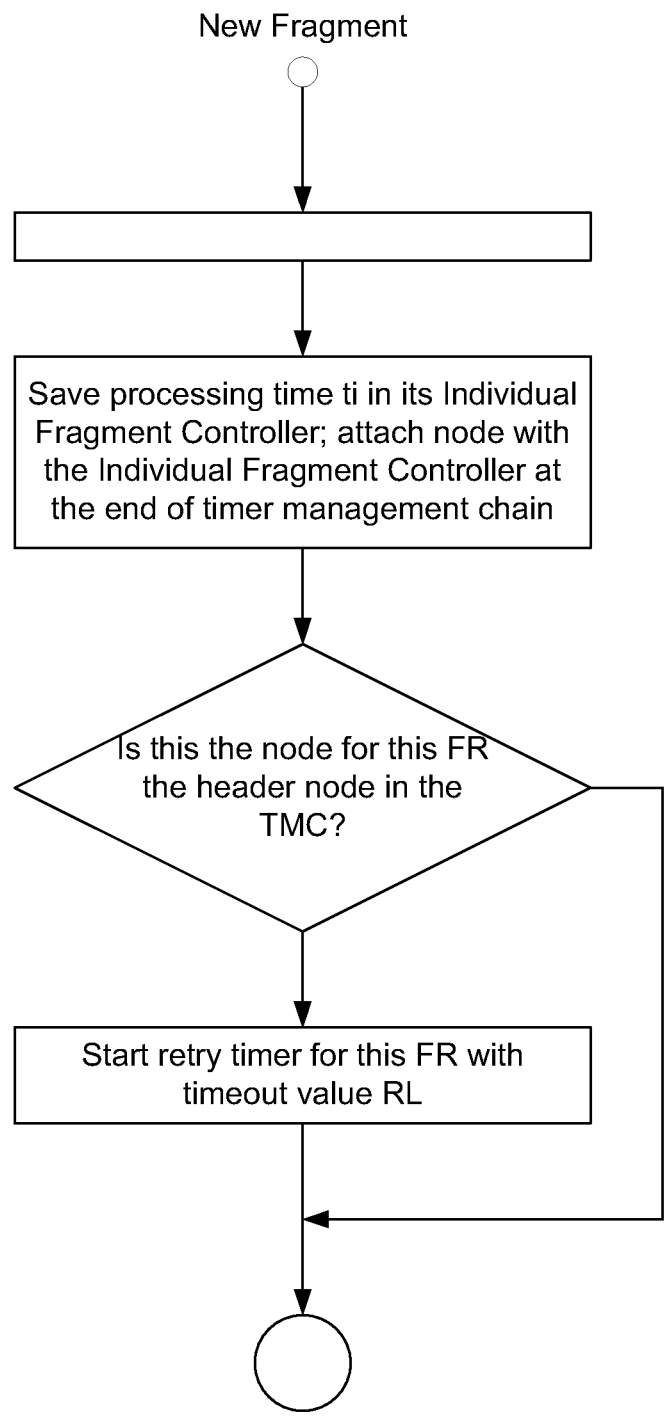

FIGS. 14a and 14b illustrate the preferred methods that use a timer management chain. When an FR is generated, it is transmitted and processed. Its processing time is recorded in its Individual Fragment Controller, and a node containing Individual Fragment Controller is added at the end of the timer management chain. See FIG. 14b. If the node for this FR is the header node, a retry timer is assigned and opened for this FR with a timeout value of RL.

When an FR is acknowledged or deleted, e.g., due to the fact that its total life time times out, the node associated with this FR is removed from the chain. If a retry timer is assigned to this FR, the timer is closed, and reassigned to the fragment for the next node having the next lowest processing index whose processing has not terminated, i.e., the node having the next lowest processing index and whose FRi has not been processed for more than RL+ti. This now becomes the header node with an FR having the lowest processing index. The new timeout value is RL−(t−ti) where t is the assignment time and ti is the processing time for the FR in this new header node.

If the retry timer assigned to the FR for the header node times out, the FR is retransmitted. The time for the retransmission becomes the new processing time for this re-transmitted FR and is saved in the Individual Fragment Controller for this FR. The processing index for this FR may also be changed to reflect the new processing time. Given this change, the node associated with this Fragment is removed as the header node and moved or reattached to the end of the chain.

Similarly, if the FR is negatively acknowledged, it may be re-transmitted. Upon re-transmission, the information in the Individual Fragment Controller may be updated for this FR to reflect the re-transmission Fragment Controller and the node with the updated Individual Fragment Controller may be removed and re-attached as herein discussed. Similarly, if this node is the header node, then the timer may be re-assigned in the same manner as discussed previously to the FR for the next node having the lowest processing index and whose processing has not been terminated.

For transmission, the preferred methods of this invention use only one timer, a retry timer for the management of fragments in a CID connection. It is an alternate method to the inventors' previous application "Methods of Management of Blocks and Block Life Timer Resource" having an application Ser. No. 11/778,583, where methods of using one life timer but multiple retry timers were disclosed. Therefore, the preferred methods not only reduce the number of the timers and therefore the timer resource but also complexity of the processing of the timers such as timer opening, deleting and timeout processing. This timer resource saving is significant, for both subscriber devices and base stations that service multiple user devices simultaneously.

Preferred Methods for the Reception of Fragments

Figure 7:
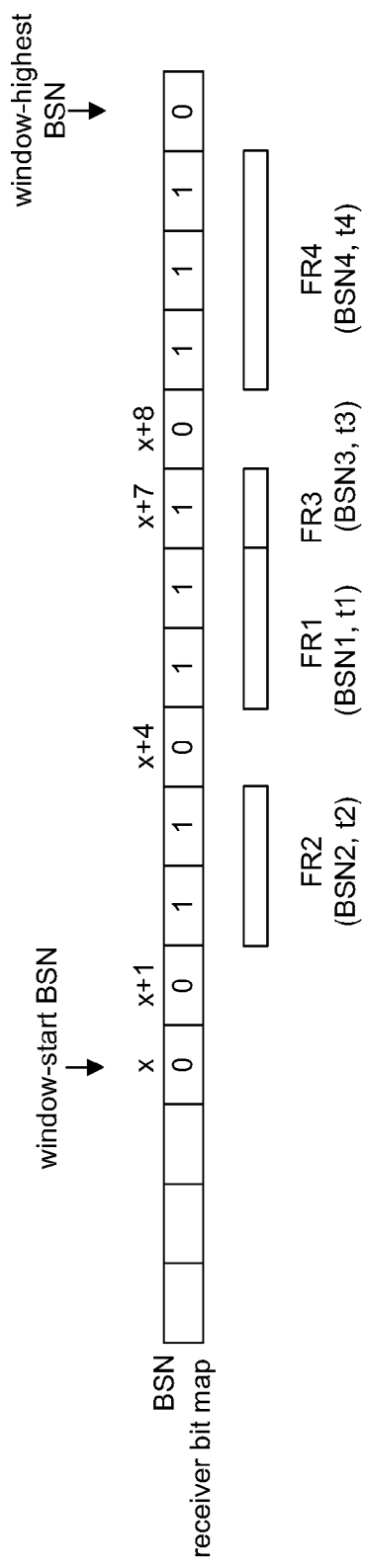
FIG. 7 is an illustration of a receiver window for received fragments using the preferred methods of this invention for managing received fragments.

Other presently preferred methods of the present invention uses only one timer, a purge timer for the management of received fragments for each CID connection. The purge timer may be assigned to and started for the earliest arrived fragment in the receiver window. FIG. 7 is an example of a receiver window where 4 FRs, FR1 through FR4, have been received. Using the methods of this invention, each received fragment FRi may be characterized by "i", the reception index, ti, its initial processing time, also referred herein as its arrival or reception time, and its start-BSN. Only the earliest arrived fragment within the receiver window (the unterminated fragment having the lowest processing or reception index) is assigned the single purge timer which is started after its first assignment. For the example illustrated in FIG. 7, the earliest arrived FR is FR1.

For the preferred methods of this invention, the timer assigned to an FRi is closed and reassigned to a new FR when the processing of FRi is terminated. For the preferred methods of reception, the processing of an FRi is terminated upon the meeting of one of three conditions. The first is the time out of the purge timer assigned to that fragment FRi. The second is the moving of the receiver window in which the one or more BLKS within FRi are not in the receiver window. The third is the reception of a duplicate of FRi.

Figure 8:
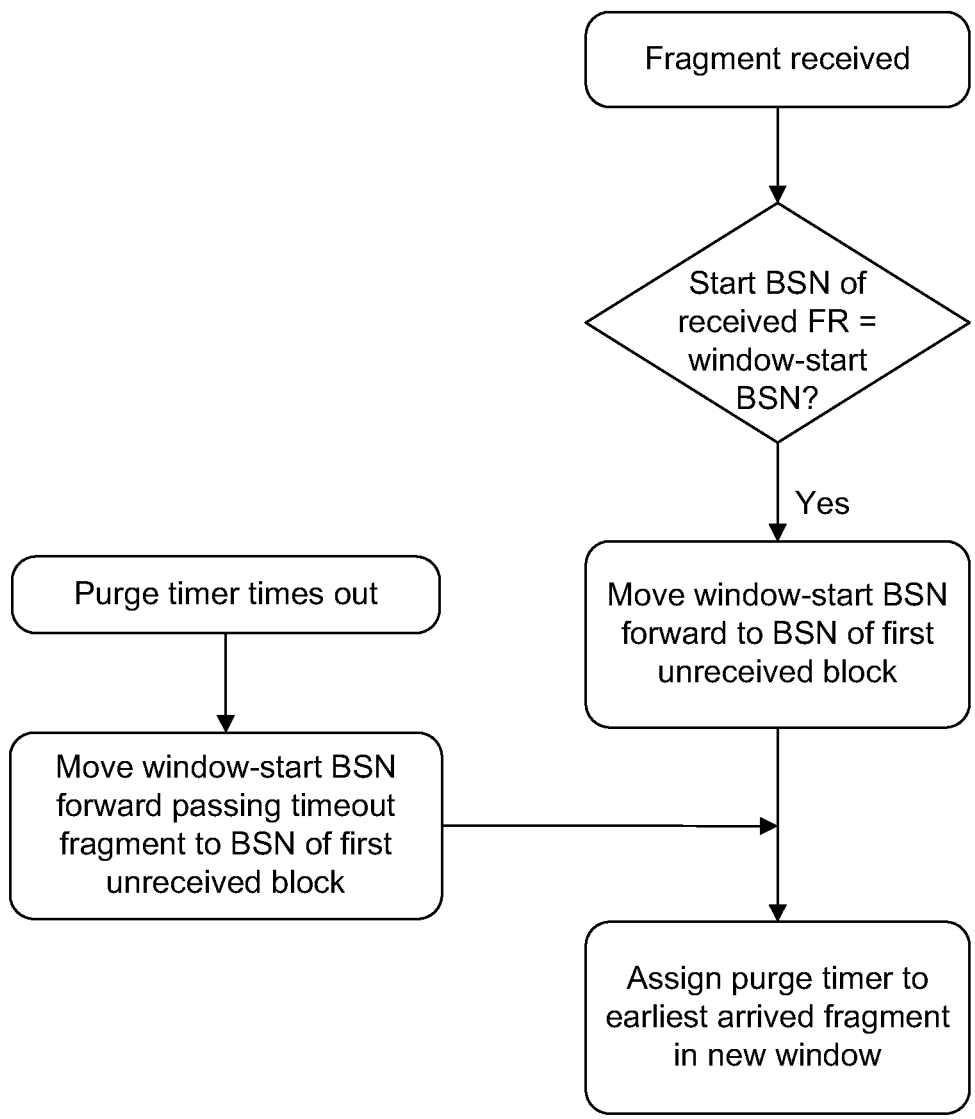
FIG. 8 is a flowchart illustrating a preferred method to move forward the window-start BSN.

The pre-defined conditions (second pre-defined conditions) for changing the lower bound for the receiver window, i.e., the moving forward of the window-start BSN is similar to current methods. The window-start BSN is moved forward when one of two conditions is met. The first is the arrival of a received BLK in a received fragment with a BSN that matches the window-start BSN. The second is the timeout of the purge timer assigned to a received fragment in the receiver window. FIG. 8 is an illustration of this process.

When the BSN of a received block in a received fragment matches that of the window-start BSN, the window-start BSN will move forward to the BSN of the first unreceived block and be assigned as the new window-start BSN. When the window-start-BSN moves forward, it will close the purge timer if the purge timer is assigned to a fragment along its path forward to the new window-start-BSN. That is, when the new window-start BSN is greater than the start-BSN of the fragment that the purge timer is assigned to, this purge timer may be stopped and be reassigned to another fragment that is within the new receiver window.

When the purge timer assigned to a fragment in the receiver window times out, the receiver will force the lower bound of the receiver window to move forward past the fragment with the timed out purge timer to the first unreceived BLK as if all FRs and BLKs, including the FR with the timed out purge timer, have been received. The purge timer is then assigned to the earliest arrived FR, i.e., the FR having the lowest reception index, within the new receiver window. For the example in FIG. 7, if the purge timer assigned to FR1 times out, then the window-start BSN may be moved forward to the x+8 and the purge timer may be assigned to FR4, the earliest arrived fragment or the un-terminated fragment having the lost processing index within the new bounds of the receiver window.

For the methods of this invention, when the lower bound for the receiver window moves, i.e., when the window-start BSN is moved forward, if the purge timer is assigned to a fragment that is in the path to the new window-start BSN, the purge timer would be closed and would be restarted for a fragment within the new bounds of the new receiver window. If the purge timer is not closed, i.e., it is still within the new bounds for the receiver window, then the purge timer remains and continues until it times out or is closed when the receiver window moves. If the purge timer is closed because of the moving forward of the window-start-BSN, then, the purge timer may be assigned to a new FR within the window and re-started. The preferred methods identify the earliest arrived fragment within the window, assign the purge timer to this fragment, and restart the purge timer for this fragment with a timeout value of $(PL-(t-ti))$ where t is the time of the assignment, and ti is the arrival time (processing time). PL, the purge life for the fragments in the connection, is a preconfigured value for the fragments in the connection and is the purge time for a fragment assigned to the purge timer. Since $(t-ti)$ time has already passed at the time of the assignment of the purge timer, the timeout value for the purge timer is $(PL-(t-ti))$ such that the purge timer times out at the end of the fragment purge time.

Figure 9:
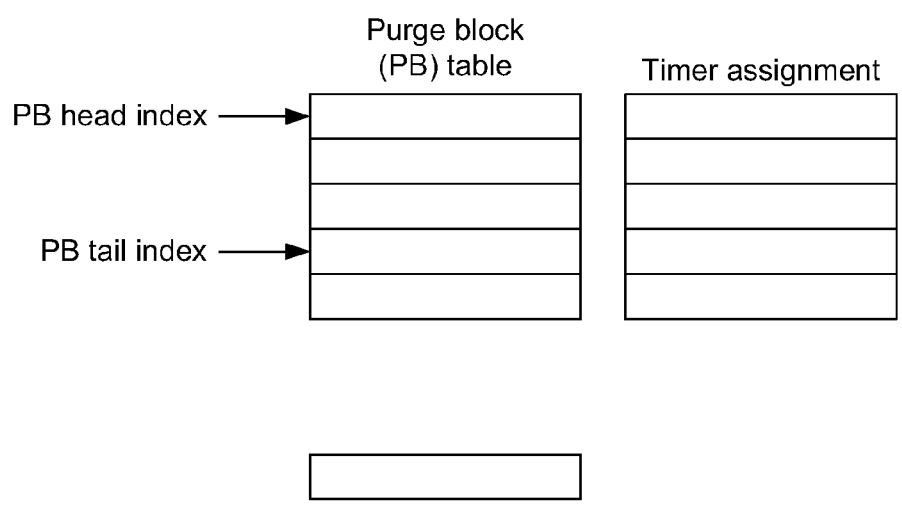
FIG. 9 is an example of a purge block table for a preferred method of this invention.

In one preferred method, to emulate the prior art purge timers for all the received fragments such that only one purge timer is used, each fragment's start BSN and arrival time are saved as an entry in a Purge Block (PB) table in the order of its arrival sequence (processing time). Thus, a received fragment is entered as an entry in the PB table. An earlier entry has an arrival time that is earlier than the arrival time of a later entry. FIG. 9 is an example of a PB table. A purge timer is always assigned and started for the first entry in this table. If the first entry is the fragment FRi, then the purge timer may have a timeout value of $PL-(t-ti)$, where PL is the fragment life or fragment purge life for the fragments in the connection, t is the time of assignment of the purge timer, and ti is the arrival time of FRi. The PB head index initially points to the first entry. A PB tail index points to the empty entry after the entry of the latest arrived fragment. There is no more received fragments when the PB head index equals to the PB tail index.

Once the lower bound of the receiver window is determined to be changed, i.e., when the window-start BSN moves forward past the first entry, the next fragment to assign the purge timer is identified. One preferred method in using the PB table is to move the PB head index pointer to the next effective entry, i.e., the next entry in the PB table that is within the receiver window that has the lowest processing or reception index.

To find the next effective entry, the next entry is found by increasing the PB head index by 1. If the PB head index is equal to the PB tail index, then there are no more entries or fragments and the processing is completed for all fragments. If not this is the fragment with the next earliest arrival time.

Figure 11:
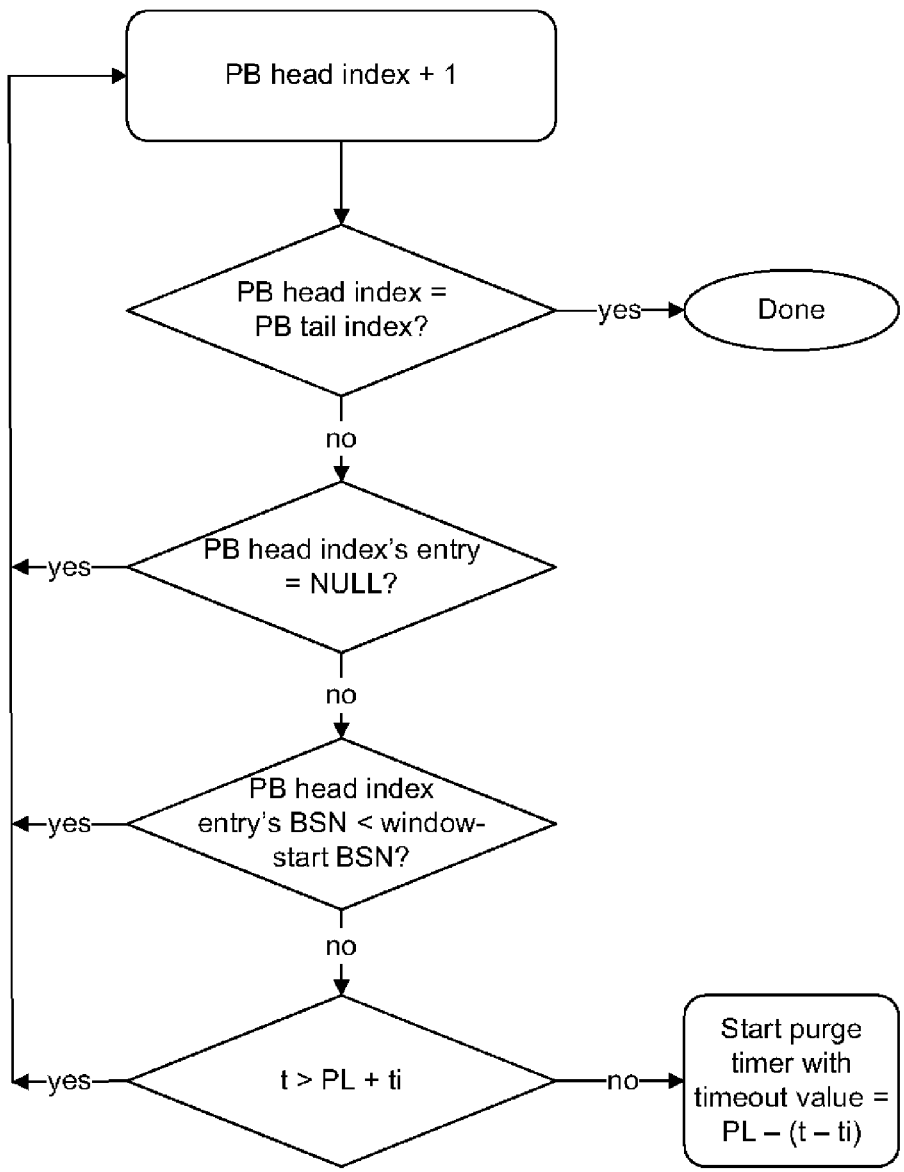
FIG. 11 is a flowchart illustrating a preferred method of this invention for using one timer for receiving fragments.

However, this processing of this fragment may have been terminated. The processing of this FR may have been previously determined to be terminated as indicated by a "NULL" or other indication. Even if there is no overt indication that the processing for this FR has terminated, the FR still has to be examined to see if it has been terminated. If the start BSN of the FR in this entry is greater than the window-start BSN, then the processing of this FR is not terminated and this entry is the next effective entry. If the start BSN of the FR in this entry is less than the new window-start BSN, this entry is not within the receiver window and therefore the processing of the FR in this entry has been terminated. This FR is purged and therefore, the next entry is located again by increasing PB head index by one and examined. This process will be repeated until the next effective entry is located and the next earliest arrived fragment within the receiver window with a start BSN greater than the window-start BSN is found; or when there are no fragments left in the PB table. This next earliest arrived fragment, referred to as FRi, is the entry in the PB table as indicated by the PB head index. The purge timer is assigned to this entry and it is started. If a fragment purge life is PL, since $(t-ti)$ has passed since the block has been received, the timeout value for the purge timer may be set to $(PL-(t-ti))$ where ti is the arrival time of the FRi, t is the time of assignment and started. FIG. 11 is an illustration of the process for locating the next effective entry and assigning and starting a purge timer when the window-start BSN moves forward.

When a duplicated fragment is received, current methods using the IEEE standard 802.16 that assigns a purge timer to every received fragment require that a purge timer be assigned to this fragment with the later arrival time. In the preferred methods of this invention, when a duplicate fragment is received, the processing of the original FR of this duplicated FR is terminated. In the preferred methods where a PB table is used for implementation, the entry for the terminated original fragment may be indicated with a "NULL" or other indication.

If the purge timer is assigned to the original of this duplicate FR. The purge timer is closed and reassigned to the next un-terminated FR having the lowest processing or reception index using the methods described above.

The duplicated fragment may have a processing index or reception index that reflects the arrival or processing time for this duplicated FR. For preferred embodiments that use the PB table to implement the methods of this invention, a new entry is made into the PB table with a new processing index that is logged at the tail entry in the PB table and the PB tail index is increased by 1.

If the purge timer is opened for the earlier arrived fragment of this duplicated block, it may be stopped and the purge timer is reassigned to the next entry in the PB table. In FIG. 11 where a preferred method for locating the earliest arrived fragment is illustrated, after the PB head index is increased by one, if the new first entry is found to be a "NULL" entry, then, the PB head index is increased by one again to bypass this entry since the fragment that originally occupy this entry has been entered as a new entry with a later arrival time.

In another embodiment, the PB table contains pointers where each pointer pointing to a set of information contained in the block data management structure (Fragment Controller) with respect to each received fragment. Such information for each fragment includes the fragment's start BSN, and a PB index, also referred to herein as the processing index or the reception index and in which points to this fragment's pointer in the PB table, and its arrival time. Information in the block data management structure may be linked to the PB table by the PB index of the respective fragment entries.

Figure 10:
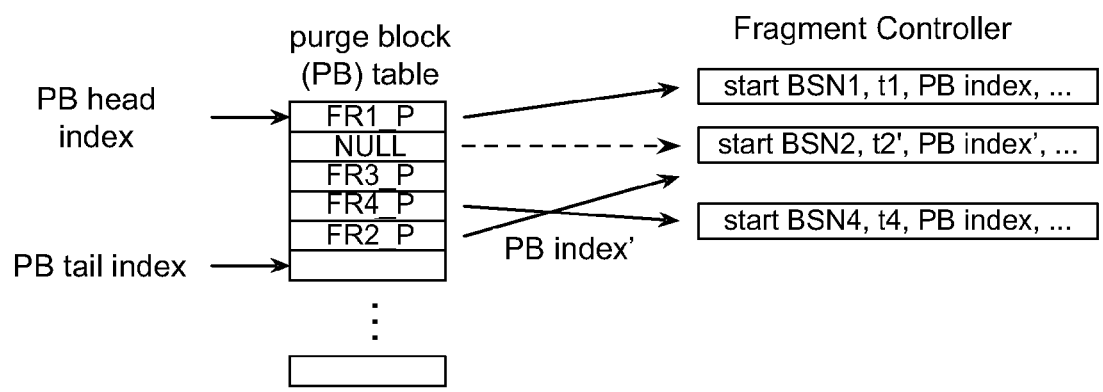
FIG. 10 is another example of a purge block table for another preferred method of this invention.

FIG. 10 is an illustration of this PB table and the block data management structure. The received fragments are entered as entries in to the PB table. The index of an entry in respect to the PB table is saved in the block data management structure as the PB index, the reception index or the processing index. This PB index can serve as a mechanism to enable or disable an entry in the PB table when there is a duplicative fragment. As before, a start pointer such as a PB head index pointer points to the first entry, the earliest arrived fragment within the window, while the PB tail index points to the first empty entry below the latest arrived entry, where there may be one or more "NULL" entry above it. When the lower bound of the receiver window changes, i.e., when the window-start BSN move past the first entry, i.e., past the fragment that the purge timer was previously assigned to or this purge timer times out, it becomes necessary to identify the next fragment to assign the purge timer.

In using the PB table, the PB head index pointer is moved to the next entry, the fragment with the next earliest arrival time in the table by increasing the PB head index by 1. If the start BSN for the fragment in this new entry is less than the window-start BSN, this new entry is not within the receiver window and will be purged by increasing the PB head index by one. This process will be repeated until the earliest arrived fragment within the receiver window with a start BSN greater than the window-start BSN, i.e., the unterminated FR having the lowest reception or PB index, is found or, when there are no fragments left in the PB table.

This earliest arrived fragment, referred to as FRi, is the first entry in the PB table as indicated by the PB head index. The purge timer is assigned to this new first entry and is started. If the purge life of a fragment is PL, since (t–ti) has passed since the block has been received, the timeout value for the purge timer may be set to (PL–(t–ti)), where ti is the arrival time, and t is the time of assignment. FIG. 11 is an illustration of the process described above for assigning and starting a purge timer when the window-start BSN moves forward.

Upon receiving a duplicate fragment, the original entry to that duplicate fragment is found and the original entry in the PB table is changed to a "NULL" entry. If the PB head index moves to a "NULL" entry, this entry is disabled and the PB head index is moved to the next entry in the PB table. The duplicate fragment is entered as a new entry in sequence according to the arrival time of that duplicate fragment. However, as shown in FIG. 10, the PB index for the original entry in the Fragment Controller is updated to the index of the new entry (for this duplicate fragment).

Figure 12:
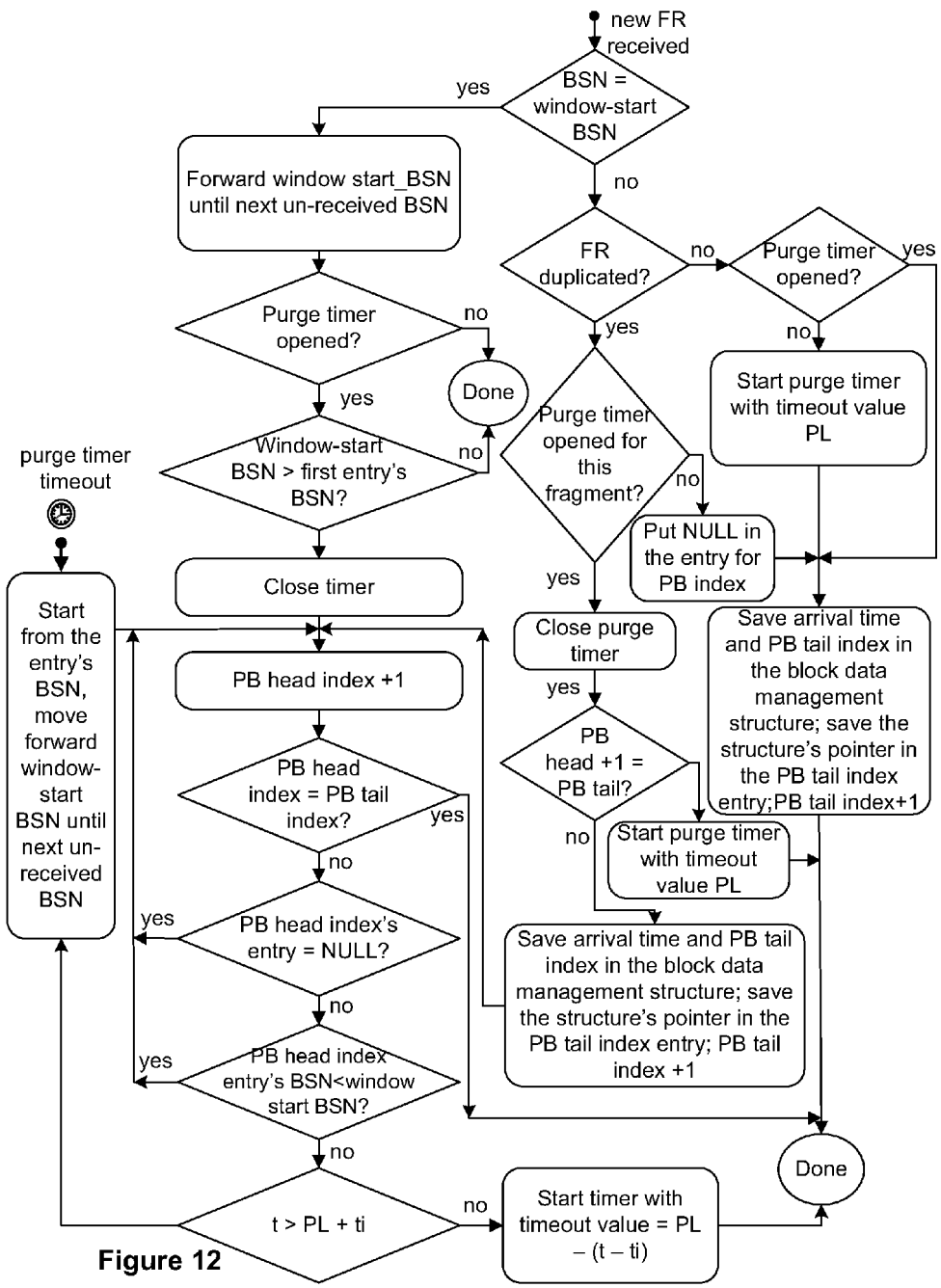
FIG. 12 is a flowchart illustrating another preferred method of this invention for using one timer for receiving fragments.

FIG. 12 illustrates a preferred method for the management of received data and the purge timer based on the PB table and block data management structure one example of which is illustrated in FIG. 10.

If the start BSN of a received fragment is the same as the window start BSN, the window-start BSN is moved forward to the next unreceived block. An opened purge timer is closed if it is assigned to a fragment not within the new bounds of the window, for example, if the purge timer is assigned to a fragment with a start BSN that is lower than the new window-start BSN. The purge timer is then reassigned to the earliest arrived fragment within the new bounds of the window and restarted as is previously described and illustrated in FIG. 8. If the purge timer is assigned to a fragment that is still within the new bounds of the receiver window bounded by the new window-start BSN, then the purge timer remains assigned to that fragment and may not need to be reassigned.

If the purge timer assigned to a fragment times out, the window-start BSN is moved forward to the first unreceived fragment past the fragment with the timed out fragment. The purge timer is then reassigned to the earliest arrived fragment within the new bounds of the window and re-started as is previously described and illustrated in FIG. 8.

If the start BSN of a newly received fragment is not equal to the window-start BSN, the fragment is checked to determine if it is a duplicate fragment. If it is a duplicate fragment and the purge timer is not assigned to the original of this duplicate fragment, the original is removed such that its entry that is indexed by a PB index in the block data management structure in the PB table becomes a "NULL" entry and the duplicate fragment is logged as a new entry at the tail of the PB Table. If a purge timer is assigned to the original of this duplicate fragment, the purge timer is closed and reassigned to the earliest arrived fragment within the window and restarted as described previously. The arrival time and the new PB index for this duplicate fragment may also be saved in the block data management structure; the pointer for the structure may be saved at the new entry pointed by the PB tail index; and the PB tail index may be updated by 1. If there are no fragments within the receiver window other than the newly arrived duplicated fragment, i.e., if the PB head index+1=PB tail index before the updating of the block data management structure and pointer information, then the purge timer is started for this newly arrived duplicated fragment with a timeout value of PL.

If the received fragment is not a duplicate, the relevant information for that fragment is entered into the block data management structure and the PB tail index and the structure's pointer in the PB tail index are updated for that received fragment. If no purge timer has been assigned or started within the window, the purge timer is started with a timeout value of PL, the life for that received fragment.

Figure 15:
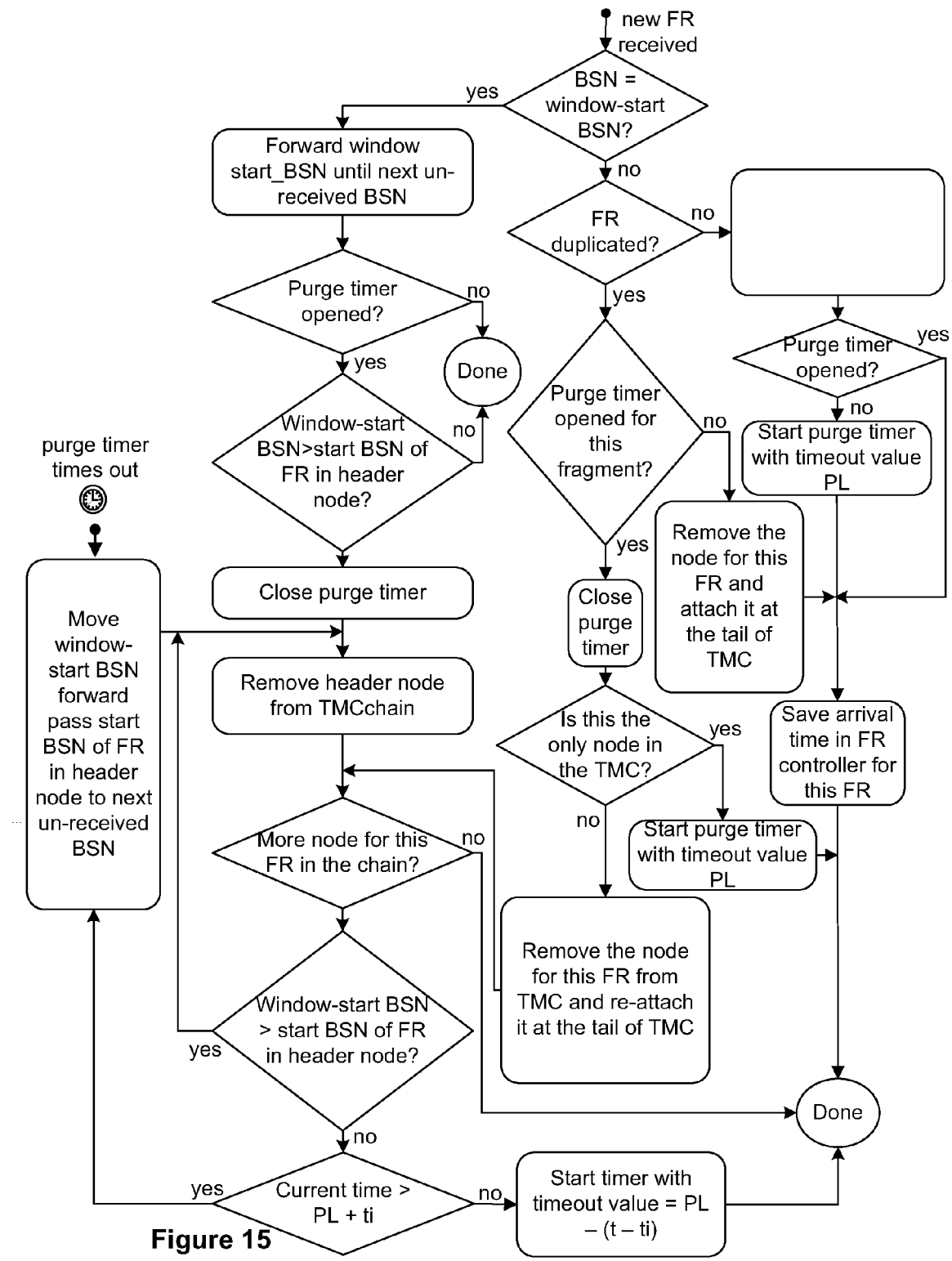
FIG. 15 is a flow chart illustrating a preferred method of this invention using one timer and a timer management chain for receiving fragments.

FIG. 15 illustrates the preferred methods for timer management when a TMC is used. When a new FR is received, the start BSN of that FR is checked against the window-start BSN. When the start BSN of that FR is not equal to the window-start BSN and this FR is not a duplicate of another received FR, its processing time, i.e., arrival time ti is saved in its Individual Fragment Controller and the node having the Individual Fragment Controller is added to the end or tail of the TMC. If this node is the header node, i.e., if no purge timer has been opened, then the purge timer is assigned to the FR for this node with a timeout value of PL.

If the start BSN of this FRi is the same as the window-start BSN, the window-start BSN may be moved forward to the first un-received BSN number. If the new window-start BSN is greater than the start BSN of the FR of the header node, then the processing of the FR of the header node is terminated. The purge timer is closed and the header node is moved from the TMC. If the start BSN of the FR in the new header node is less than the window-start BSN, then its processing is terminated and it is removed from the head of the chain. This is repeated until window-start BSN is less than the start BSN of the FR of the header node or until there are no nodes left in the TMC. If an FR, referred to herein as FRi, in a header node with a start BSN greater than the window-start BSN and the processing of FRi has not terminated, i.e., if the current time is greater than PL–ti, then, the purge timer is assigned to that FR, referred to as FRi and restarted with a timeout value of PL–(t–ti) where t is the assignment time.

If the start BSN of the received FR is not equal to the window-start BSN, but is a duplicate FR of a previously received FR, the Individual Fragment Controller for that previously received FR is removed from the chain and re-attached to the end or tail of the TMC. Its Individual Fragment Controller is updated to reflect the new processing time (the arrival time for the duplicate FR) and processing index. If a purge timer was assigned to the previously received FR, the timer is closed and reassigned to the next header node whose processing has not been terminated as described previously.

When the purge timer times out, the processing of the FR in the header node is terminated, the window-start BSN may be moved forward pass the BSN of the FR of the header node to the first un-received BSN. The header node is removed from the TMC. If the new window-start BSN is greater than the start BSN of the FR in the new header node, the processing of this the FR for this new header node is terminated and this new header node may be removed from the TMC. As previously described, this procedure is repeated until the start BSN of an FR for a header node is greater than the window-start BSN or until there are no more nodes in the TMC. If such a header node is found, the purge timer is assigned to the FR, referred to as FRi, in the header node with a timeout value of PL−(t−ti).

While the present invention has been described with reference to certain preferred methods, it is to be understood that the present invention is not limited to such specific methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

What we claim:

1. A transceiver for processing data units using a timer for a connection with another transceiver, the transceiver comprising:
    a first module for processing a data unit according to a processing index of the data unit, wherein the data unit is processed till one or more of predefined conditions is met, the predefined conditions include: a timer assigned to the data unit is timed out or an acknowledgement of the data unit is received; and
    a second module designed to initiate the timer assigned to the data unit, wherein the timer is running until processing of the data unit is terminated, the timer is then initiated and assigned to a next one of the data units before the next one of the data units is processed, wherein the timer is repeatedly initiated and assigned to a next one of the data units till all of the data units are processed for the connection.

2. The transceiver of claim 1, wherein the timer is used to control the transceiver how to try retransmission of one of the data units when an acknowledgement of the one of the data units is not received within a predefined time.

3. The transceiver of claim 1, wherein the timer is timed out after a timeout setting.

4. The transceiver of claim 3, wherein the timeout setting is a function of a life predefined for the one of the data units, an assignment time of the one of the data units, and a processing time of the one of the data units.

5. The transceiver of claim 3, wherein the timeout setting is a function of a retry life predefined for the one of the data units, an assignment time of the one of the data units, and a transmission time of the one of the data units.

6. The transceiver of claim 1, wherein while continuing to process the data units sequentially, the transceiver is configured to wait for one or more of conditions to happen, the conditions include:
    timing out of the timer;
    an acknowledgement of the data unit;
    a negative acknowledgement of the data unit; or
    deletion of the data unit.

7. The transceiver of claim 6, wherein the timer is initiated and assigned to the next one of the data units when the one or more of the conditions happen.

8. The transceiver of claim 7, wherein the timer triggers a life predefined for the next one of the data units, an assignment time of the next one of the data units, and a processing time of the next one of the data units.

9. The transceiver of claim 1, wherein the timer is used to control the transceiver how to purge one of the data units when the one of the data units is received within a predefined time.

10. The transceiver of claim 9, wherein the timer is timed out after a timeout setting.

11. The transceiver of claim 10, wherein the timeout setting is a function of a life predefined for the one of the data units, an assignment time of the one of the data units, and a processing time of the one of the data units.

12. The transceiver of claim 11, wherein the timeout setting is a function of a purge life predefined for the one of the data units, an assignment time of the one of the data units, and a received time of the one of the data units.

13. The transceiver of claim 1, wherein while continuing to process the data units sequentially, the transceiver is configured to wait for one or more of conditions to happen, the conditions include:
    time out of the timer assigned to the data unit being received; and
    reception of a duplicate of the data unit.

14. The transceiver of claim 13, wherein the timer is initiated and assigned to a next one of the data units received when the one or more of the conditions happen.

15. The transceiver of claim 14, wherein the next one of the data units is received right after the data unit.

16. The transceiver of claim 14, wherein the timer triggers a life predefined for the next one of the data units, an assignment time of the next one of the data units, and a processing time of the next one of the data units.

* * * * *